(12) United States Patent
Sugita et al.

(10) Patent No.: US 12,741,869 B2
(45) Date of Patent: Sep. 22, 2026

(54) SODIUM BOROHYDRIDE PRODUCTION METHOD

(71) Applicant: NIPPON LIGHT METAL COMPANY, LTD., Tokyo (JP)

(72) Inventors: Kaoru Sugita, Shizuoka (JP); Yuji Oota, Shizuoka (JP); Yo Rene Abe, Shizuoka (JP); Takuma Hachisu, Tokyo (JP); Takehiro Matsunaga, Ibaraki (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 1216 days.

(21) Appl. No.: 17/632,123

(22) PCT Filed: Aug. 5, 2020

(86) PCT No.: PCT/JP2020/030035

§ 371 (c)(1),
(2) Date: Feb. 1, 2022

(87) PCT Pub. No.: WO2021/025069

PCT Pub. Date: Feb. 11, 2021

(65) Prior Publication Data

US 2022/0281742 A1 Sep. 8, 2022

(30) Foreign Application Priority Data

Aug. 6, 2019 (JP) ................................ 2019-144884
Jul. 1, 2020 (JP) ................................ 2020-114418

(51) Int. Cl.
*C01B 6/21* (2006.01)
*C01B 3/00* (2006.01)

(52) U.S. Cl.
CPC . *C01B 6/21* (2013.01); *C01B 3/00* (2013.01)

(58) Field of Classification Search
CPC .................................. C01B 6/21; C01B 3/00
See application file for complete search history.

(56) References Cited

U.S. PATENT DOCUMENTS 3,471,268 A 10/1969 Claude et al.
3,505,035 A 4/1970 Horn et al.
6,358,488 B1 3/2002 Suda
2007/0128509 A1 6/2007 Hong
(Continued)

FOREIGN PATENT DOCUMENTS

CN 101195489 A 6/2008
CN 101407918 4/2009
(Continued)

OTHER PUBLICATIONS

Korean Office Action (KROA) dated Jan. 4, 2024 issued in Korean patent application No. 10-2022-7003171 and its English machine translation.

(Continued)

*Primary Examiner* — James A Fiorito
(74) *Attorney, Agent, or Firm* — RANKIN, HILL & CLARK LLP

(57) ABSTRACT

In a hermetic vessel filled with hydrogen gas, a sodium borate and aluminum powder are reacted at not less than 400° C. and not more than 560° C. while performing stirring to produce sodium borohydride with the molar ratio of sodium contained in the sodium borate being larger than 0.5 relative to boron contained in the sodium borate.

4 Claims, 19 Drawing Sheets

(56) References Cited

U.S. PATENT DOCUMENTS

| | | | |
|---|---|---|---|
| 2009/0214409 | A1 | 8/2009 | Chin et al. |
| 2011/0286913 | A1 | 11/2011 | Lugtigheid |
| 2017/0183236 | A1 | 6/2017 | Yoshizaki |
| 2022/0274832 | A1 | 9/2022 | Sugita et al. |

FOREIGN PATENT DOCUMENTS

| | | | |
|---|---|---|---|
| CN | 101407919 | A | 4/2009 |
| CN | 101519187 | A | 9/2009 |
| CN | 101519188 | A | 9/2009 |
| CN | 101654223 | A | 2/2010 |
| CN | 102300804 | A | 12/2011 |
| CN | 104086576 | A | 10/2014 |
| CN | 105502292 | A | 4/2016 |
| CN | 106414314 | A | 2/2017 |
| CN | 106477523 | A | 3/2017 |
| CN | 107311110 | A | 11/2017 |
| CN | 108545699 | A | 9/2018 |
| EP | 1914198 | A2 | 4/2008 |
| EP | 3156364 | A1 | 4/2017 |
| EP | 4011825 | A1 | 6/2022 |
| GB | 790164 | A | 2/1958 |
| GB | 832049 | A | 4/1960 |
| GB | 879446 | A | 10/1961 |
| GB | 1059622 | A | 2/1967 |
| JP | 2809666 | B2 | 7/1998 |
| JP | 2004-10446 | A | 1/2004 |
| JP | 2006-104055 | A | 4/2006 |
| JP | 2006-143537 | A | 6/2006 |
| JP | 2006298734 | A | 11/2006 |
| JP | 2007284675 | A | 11/2007 |
| JP | 2014-181174 | A | 9/2014 |
| JP | 5839337 | B1 | 1/2016 |
| JP | 2019189483 | A | 10/2019 |
| KR | 10-1853745 | | 5/2018 |
| RU | 2689587 | C1 | 5/2019 |
| SU | 230108 | A1 | 2/1969 |
| WO | 2015/190004 | A1 | 12/2015 |
| WO | 2015/190403 | A1 | 12/2015 |
| WO | 2021/025068 | A1 | 2/2021 |

OTHER PUBLICATIONS

Russian Office Action (RUOA) dated Sep. 21, 2022 for Russian Patent Application No. 2022102387; English translation.

Chinese Office Action (CNOA) dated Mar. 27, 2023 for CN202080054242.2; English machine translation.

Liu et al., "Preparation of Sodium Borohydride and Hydrogen Production by Hydrolysis", Chemical Industry and Engineering Progress, 2009, vol. 28, pp. 208-213 and its English machine translation, total 18 pages; Cited in CNOA.

Taiwanese Office Action (TWOA) dated Feb. 19, 2021 for Taiwanese Patent Applicatoin No. 109126355 and its English machine translation.

International Search Report (ISR) dated Oct. 13, 2020 filed in PCT/JP2020/030034.

Russian Office Action (RUOA) dated Sep. 13, 2022 for Russian Patent Application No. 2022102396; English translation.

Australian Office Action (AUOA) dated Dec. 21, 2022 issued in Australian patent application No. 2020325127.

Jianfeng, Mao et al., "Recent Advances in the Use of Sodium Borohydride as a Solid State Hydrogen Store", Energies, 2015, vol. 8, pp. 430-453.

Chinese Office Action (CNOA) dated Mar. 24, 2023 for Chinese Patent Application No. 202080054489.4; English machine translation.

Wei, "Study on Anode Nanocatalysts for Direct Borohydride-Hydrogen Peroxide Fuel Cell", Chinese Master's Theses Full-text Database (CNFD), Engineering Technology Part I, 2016; English abstract.

U.B. et al., "Aluminum chloride for accelerating hydrogen generation from sodium borohydride", Journal of Power Sources 192, Elsevier, 2009, pp. 310-315.

Taiwanese Office Action issued Nov. 4, 2022 in Taiwanese Application. No. 111104095 and its English machine translation.

Taiwanese Examination opinion notification issued on Oct. 6, 2022 for Taiwanese application No. 111103650 and its English machine translation.

International Search Report (ISR) dated Apr. 5, 2022 filed in PCT/JP2022/002731.

International Search Report (ISR) dated Apr. 5, 2022 filed in PCT/JP2022/002734.

Extended European Search Report (EESR) dated Aug. 10, 2023 and issued in European Patent Application No. 20850821.8.

Extended European Search Report (EESR) dated Aug. 10, 2023 and issued in European Patent Application No. 20850574.3.

Australian Office Action (AUOA) dated in Jul. 21, 2023 and issued in Australian application No. 2020327321.

Indian Office Action (INOA) dated Mar. 15, 2022 for corresponding Indian Patent Application No. 202247003185.

Korean Written Decision on Registration dated Sep. 25, 2024 for Korean Application No. 10-2022-7003171 and its English machine translation.

Extended European Search Report (EESR1) dated Apr. 23, 2025 for European Application No. 22749558.7.

Extended European Search Report (EESR2) dated Apr. 23, 2025 for European Application No. 22749559.5.

Liu et al., "Sodium Borohydride Synthesis by Reaction of Na20 contained Sodium Borate with Al and Hydrogen" Energy & Fuels, 2007, vol. 21, No. 3, pp. 1707-1711; Cited in Specification.

Martelli et al., "Stability and Decomposition of NaBH4", The Journal of Physical Chemistry C, 2010, vol. 114, No. 15, pp. 7173-7177; Cited in Specification.

International Search Report (ISR) dated Oct. 13, 2020 filed in PCT/JP2020/030035.

Taiwanese Office Action (TWOA) dated Mar. 22, 2021 for corresponding Taiwanese Patent Application No. 109126352 and its English machine translation.

Chinese Office Action (CNOA1) dated Mar. 12, 2026 for Chinese Application No. 202280013123.1; English translation.

Chinese Office Action (CNOA2) dated Mar. 2, 2026 for Chinese Application No. 202280013376.9; English translation.

BORAX ($Na_2B_4O_7$)
INTRODUCE NaOH
S-11A
THERMAL CALCINATION STEP
(400°C OR LESS)
FIRST STEP (S-11)
S-11B
MIXING AND CONTACTING STEP
(ROOM TEMPERATURE)
INTRODUCE Al
S-12
SECOND STEP
INTRODUCE $H_2$
S-13
REACTION STEP
(400 TO 560°C)
SODIUM BOROHYDRIDE ($NaBH_4$)
$xNa_2O$
$Al_2O_3$

SODIUM METABORATE ($NaBO_2$)
S-21
DRYING STEP
(280°C OR ABOVE)
S-22
MIXING AND CONTACTING STEP
(ROOM TEMPERATURE)
INTRODUCE Al AND NaOH
INTRODUCE $H_2$
S-23
WATER REMOVAL STEP
(400°C OR ABOVE)
S-24
SBH-FORMING REACTION STEP
(400 TO 560°C)
SODIUM BOROHYDRIDE ($NaBH_4$)

FIG.10C

| No | Na | B | Al | O | ESTIMATED COMPOUNDS |
|---|---|---|---|---|---|
| 1 | 15 | 0 | 37 | 48 | $0.2Na_2O \cdot Al_2O_3+NaH$ |
| 2 | 29 | 4 | 24 | 42 | $0.9Na_2O \cdot Al_2O_3+NaBH_4$ |
| 3 | 26 | 0 | 28 | 46 | $0.6Na_2O \cdot Al_2O_3+NaH$ |
| 4 | 65 | 1 | 3 | 28 | $Na_2O$ |
| 5 | 71 | 9 | 0 | 19 | $Na_2O+NaBH_4$ |
| 6 | 92 | 0 | 0 | 8 | NaH |

FIG.11C

| No | Na | B | Al | O | ESTIMATED COMPOUNDS |
|---|---|---|---|---|---|
| 11 | 44 | 0 | 20 | 36 | $0.4Na_2O{\cdot}Al_2O_3+NaH$ |
| 12 | 79 | 5 | 0 | 16 | $Na_2O+NaBH_4$ (LOW B CONCENTRATION DETECTED) |
| 13 | 49 | 5 | 13 | 34 | $NaBO_2+Na_2O{\cdot}Al_2O_3$ |
| 14 | 70 | 14 | 1 | 15 | $Na_2O+NaBH_4$ (LOW B CONCENTRATION DETECTED) |

SODIUM BOROHYDRIDE PRODUCTION METHOD

FIELD

The present invention relates to a sodium borohydride production method, and more specifically to a method for producing sodium borohydride from sodium metaborate.

BACKGROUND

Hydrogen fuel has attracted attention as an energy alternative to petroleum fuels. Sodium borohydride (SBH) is a promising hydrogen carrier for hydrogen storage and transport and also as a hydrogen source. The social proliferation of sodium borohydride as a hydrogen carrier requires the establishment of an optimum method for the production of sodium borohydride with mass-production technique in mind.

Sodium borohydride production processes have been conventionally studied. For example, Patent Literature 1 discloses a method for producing sodium borohydride by reacting a trialkyl borate with sodium aluminum hydride.

Patent literature 2 discloses a method for producing sodium borohydride that includes a step of reacting sodium metaborate and granular aluminum under a hydrogen atmosphere, while rolling and milling the sodium metaborate and the granular aluminum using a milling medium, to obtain sodium borohydride.

Furthermore, Non-Patent Literature 1 discloses a method for producing sodium borohydride in which a mixture of sodium diborate ($Na_4B_2O_5$) and sodium metaborate is reacted with aluminum and hydrogen at a high temperature (855 K (581° C.), preferably 873 K (599° C.)) with the sodium diborate ($Na_4B_2O_5$) in the molten state to give sodium borohydride.

CITATION LIST

Patent Literature

Patent Literature 1: U.S. Pat. No. 3,471,268
Patent Literature 2: WO 2015/190403

Non-Patent Literature

Non-Patent Literature 1: Bin Hong L I U, et al., "Sodium Borohydride Synthesis by Reaction of $Na_2O$ contained Sodium Borate with Al and Hydrogen", Energy & Fuels, 2007, Vol. 21, No. 3, pp. 1707-1711

Non-Patent Literature 2: The Journal of Physical Chemistry C 114(15)7173-7177 March 2010

SUMMARY

The technique proposed in Patent Literature 1 synthesizes sodium borohydride by reducing anhydrous borax in a hydrogen atmosphere and thus involves the use of sodium hydride or metallic sodium beforehand as a reducing agent. Metallic sodium is expensive.

In the technique proposed in Patent Literature 2, a reaction portion rotatably disposed in a cylindrically shaped reaction vessel is charged with dried anhydrous sodium metaborate ($NaBO_2$) and aluminum grains having a diameter of about 3 mm; a milling medium (steel spheres having a diameter of about 30 mm) is placed in the reaction vessel; and the materials are reacted while being rolled and milled to give sodium borohydride. With the extension in the rolling and milling time, the aluminum particles are milled to such an extremely small thickness or size that further milling is difficult and the reaction stops.

In the technique proposed in Non-Patent Literature 1, sodium diborate ($Na_4B_2O_5$) needs to be brought to the molten state. Thus, the technique requires a device capable of withstanding a high temperature (855 K (581° C.), preferably 873 K (599° C.)) and a high hydrogen pressure of 2.3 MPa, and this requirement increases the scale of the vessel and adds production costs. At 1 atm, sodium borohydride is decomposed at 534° C. and above (see Non-Patent Literature 2). The temperature that is reached in the above technique (599° C.) is higher than this temperature and will cause partial decomposition even when the atmosphere is high-pressure hydrogen.

The present invention has been made in light of the problems in the art discussed above. It is therefore an object of the present invention to provide a sodium borohydride production method capable of synthesizing sodium borohydride with a simple configuration using inexpensive aluminum as a reducing agent.

A sodium borohydride production method according to a first aspect has a feature comprising reacting a sodium borate and aluminum powder in a hydrogen gas atmosphere while performing stirring at not less than 400° C. and not more than 560° C., a molar ratio of sodium contained in the sodium borate being larger than 0.5 relative to boron contained in the sodium borate.

In the first aspect, the sodium borohydride production method may further comprise adding an alkali metal oxide or an alkaline earth metal oxide, wherein a molar ratio of moles of any alkali metal and alkaline earth metal plus any alkali metal and alkaline earth metal contained in the sodium borate may be more than 0.5 and not more than 3 relative to moles of boron contained in the sodium borate.

In the first aspect, the sodium borohydride production method may further comprise adding an alkali metal hydroxide, wherein a molar ratio of moles of any alkali metal contained in the alkali metal hydroxide and the sodium borate may be more than 0.5 and not more than 3 relative to moles of boron contained in the sodium borate.

A sodium borohydride production method according to a second aspect has a feature comprising: dehydrating a mixture including an alkali metal hydroxide, a sodium borate and aluminum powder in a static condition at not less than 400° C. in a hydrogen gas atmosphere; oxidizing the aluminum powder by reaction with water to form a sodium aluminum oxide layer extending from the surface toward the inside of aluminum particles, the sodium aluminum oxide layer being represented by the chemical formula (I) below; and reacting the mixture at a temperature of not less than 400° C. and not more than 560° C. while performing stirring,

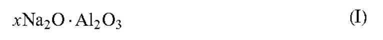

$$xNa_2O \cdot Al_2O_3 \quad \text{(I)}$$

where $0 < x < 1$.

A sodium borohydride production method according to a third aspect has a feature comprising: dehydrating a mixture including an alkali metal hydroxide, a sodium borate and aluminum powder in a static condition in a vessel while heating the vessel at not less than 400° C. under a reduced pressure; oxidizing the aluminum powder by reaction with water to form a sodium aluminum oxide layer extending from the surface toward the inside of aluminum particles, the sodium aluminum oxide layer being represented by the chemical formula (I) below; and reacting the mixture at a temperature of not less than 400° C. and not more than 560° C. in a hydrogen gas atmosphere while performing stirring,

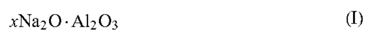

$$xNa_2O \cdot Al_2O_3 \quad (I)$$

where $0 < x < 1$.

In the first, second, and third aspect, a molar ratio of aluminum to boron in the sodium borate may be not less than 1.33.

The first or the second aspect can provide a sodium borohydride production method without requiring any large-scale or complicated facility.

Furthermore, the third aspect can provide a sodium borohydride production method without requiring any large-scale or complicated facility even in the case where the ingredients contain much water.

BRIEF DESCRIPTION OF DRAWINGS

FIG. 10C is a table illustrating the results (atomic proportions (%)) of SEM point analysis, performed after mapping analysis, at the locations corresponding to the numbers in FIG. 10A;

FIG. 11C is a table illustrating the results (atomic proportions (%)) of SEM point analysis before mapping analysis.

DESCRIPTION OF EMBODIMENTS

First Embodiment

Figure 1:
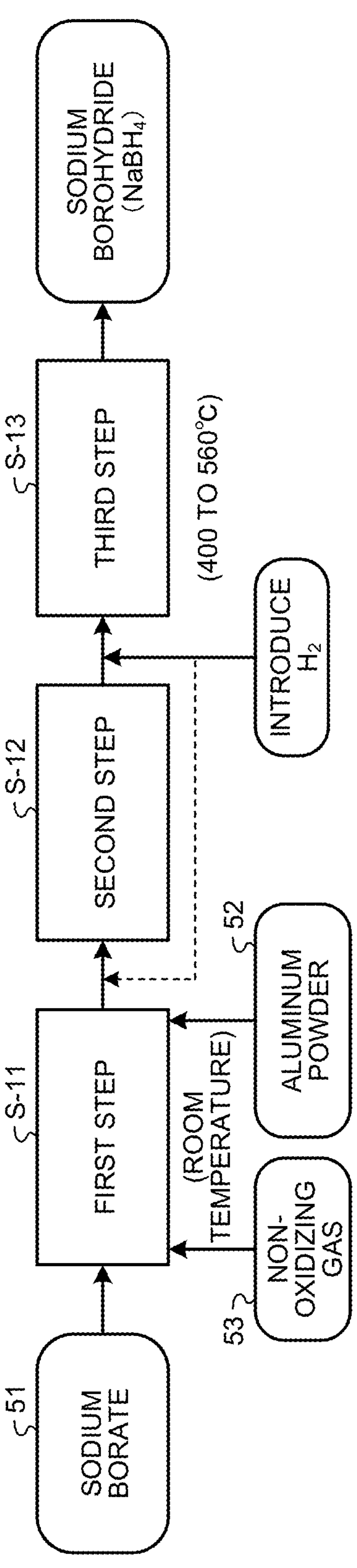
FIG. 1 is a process chart of the synthesis of sodium borohydride (SBH) from a sodium borate as an ingredient.

FIG. 1 is a process chart of the synthesis of sodium borohydride (SBH) from a sodium borate as an ingredient.

In a sodium borohydride production method according to the first embodiment, a sodium borate and aluminum powder are mixed together in a hermetic vessel filled with hydrogen gas, and the mixture is reacted at not less than 400° C. and not more than 560° C. The sodium borate powder and the aluminum powder undergo the reaction each in the solid state. As illustrated in FIG. 1, the sodium borohydride production method according to the first embodiment includes a first step (S-11) to a third step (S-13).

A sodium borate 51 as a sodium borate at the first step is a double oxide obtained from borax as a starting material by the addition of sodium hydroxide. Specifically, the sodium borate is such a double oxide including diboron trioxide ($B_2O_3$) and sodium oxide ($Na_2O$) with a Na/B ratio in the range of 0.5 to 3.0. Specific examples of the sodium borates include borax (sodium tetraborate: $Na_2B_4O_7$), sodium metaborate ($NaBO_2$ ($=Na_2B_2O_4$)) and sodium diborate ($Na_4B_2O_5$), but are not limited thereto as will be described below.

Table 1 lists the configurations in which diboron trioxide ($B_2O_3$) and sodium oxide ($Na_2O$) are present. As listed in Table 1, sodium borate ingredients A to F (hereinafter, also referred to as the "ingredients A to F") each include a sodium borate composed of diboron trioxide ($B_2O_3$) and sodium oxide ($Na_2O$) that occur in the specified configuration when sodium oxide ($Na_2O$) is increased to borax (sodium tetraborate: $Na_2B_4O_7$) as the starting material.

TABLE 1

| Ingredients | A | B | C | D | E | F |
|---|---|---|---|---|---|---|
| Sodium borate | Borax $Na_2B_4O_7$ | | Sodium metaborate ($NaBO_2$) | | Sodium diborate ($Na_4B_2O_5$) | |
| Na/B | Na/B = 0.5 | 0.5 < Na/B < 1 | Na/B = 1 | 1 < Na/B < 2 | Na/B = 2 | 2 < Na/B |
| Configurations | $B_2O_3$—$Na_2O$—$B_2O_3$ | Mixture of $B_2O_3$—$Na_2O$—$B_2O_3$ and $N_2O$ | $B_2O_3$—$Na_2O$ | Mixture of $Na_2O$—$B_2O_3$—$Na_2O$ and $B_2O_3$—$Na_2O$ | $Na_2O$—$B_2O_3$—$Na_2O$ | Mixture of $Na_2O$—$B_2O_3$—$Na_2O$ and $Na_2O$ |

In Table 1, the ingredient A is borax. Borax exists in the form of sodium tetraborate (anhydrous), sodium tetraborate (pentahydrate) and sodium tetraborate (decahydrate). Borax decahydrate occurs naturally as crystal. Thus, the ingredient A may be isolated as crystal by crystallizing the hydrate from a solution, and separating and drying the hydrate.

The ingredient C is sodium metaborate ($NaBO_2$ ($=Na_2B_2O_4$)), which is a sodium borate with Na/B (by mol)=1.0 obtained by adding sodium hydroxide (NaOH ($Na_2O.H_2O$)) to borax. Sodium metaborate that is the ingredient C may be isolated as crystal by crystallizing the hydrate from a solution, and separating and drying the hydrate.

Here, Na/B (by mol) is the molar ratio of the total of any alkaline metal plus sodium in the sodium borate, relative to boron (hereinafter, also referred to as "Na/B").

The ingredient E is sodium diborate ($Na_4B_2O_5$) that is a sodium borate with Na/B=2.0 obtained by adding sodium hydroxide (NaOH($Na_2O.H_2O$)) to sodium metaborate. Sodium diborate that is the ingredient E cannot be crystallized from a hydrate solution and thus cannot be isolated as crystal from an aqueous solution.

Furthermore, the ingredient B is a sodium borate with 0.5<Na/B<1.0. This borate is principally composed of borax at first, and gradually comes to contain an increased proportion of sodium oxide ($Na_2O$). The ingredient B is a mixture of borax ($Na_2B_4O_7$) and sodium oxide ($Na_2O$).

The ingredient D is a sodium borate with 1.0<Na/B<2.0. This borate is principally composed of sodium metaborate at first, and gradually comes to contain an increased proportion of sodium oxide ($N_2O$) to be a mixture of sodium metaborate ($NaBO_2$) and sodium diborate ($Na_4B_2O_5$). The ingredient D is a liquid containing the hydrate, but the hydrate cannot be crystallized and thus cannot be isolated as crystal.

The ingredient F is a sodium borate with 2.0<Na/B. This borate is principally composed of sodium diborate ($Na_4B_2O_5$) at first, and gradually comes to contain an increased proportion of sodium oxide ($Na_2O$) to be a mixture of sodium diborate ($Na_4B_2O_5$) and sodium oxide ($Na_2O$). Sodium diborate is the main crystal of this ingredient F, but cannot be crystallized from an aqueous solution and thus cannot be isolated as sodium diborate crystal. At a high value of Na/B, excess sodium oxide ($Na_2O$) occurs. When Na/B is 2 or greater, the ingredient F exists in the free state.

From the foregoing, the sodium borate is a double oxide containing diboron trioxide ($B_2O_3$) and sodium oxide ($Na_2O$) in a specific ratio. As described above, for example, sodium metaborate ($NaBO_2$) is the ingredient C (Na/B (by mol)=1.0; $Na_2O$:$B_2O_3$=1:1), and sodium diborate ($Na_4B_2O_5$) is the ingredient E (Na/B (by mol)=2.0; $Na_2O$:$B_2O_3$=2:1). However, other mixtures of $Na_2O$ and $B_2O_3$ in an appropriate ratio that have no specific names may also be used as ingredients in the production of sodium borohydride (SBH).

Na/B (by mol) in the sodium borate is preferably in the range of more than 0.5 and not more than 6, and more preferably in the range of more than 1.0 and not more than 3.

Steps will be described in detail below. The sodium borate used at the steps hereinbelow is an isolated crystal of sodium metaborate.

First Step

As illustrated in FIG. 1, at the first step (S-11), a sodium borate 51 that is sodium metaborate and aluminum powder 52 are charged into a hermetic vessel, and thereafter a non-oxidizing gas 53 is introduced into the hermetic vessel to fill the inside with the non-oxidizing gas atmosphere. The hermetic vessel may be already filled with the non-oxidizing gas before the charging of the ingredients.

The first step mainly provides the ingredients and charges them. At the first step, the inside of the hermetic vessel is filled with a non-oxidizing gas to prevent the attachment of water in the air to the sodium metaborate and to the oxide film on the surface of aluminum. The hermetic vessel may be filled with a non-oxidizing gas before or after the ingredients are charged into the hermetic vessel.

Here, the non-oxidizing gas 53 may be, for example, hydrogen gas or a rare gas (such as, for example, helium gas or argon gas). Alternatively, the first step may be a step in which a sodium metaborate and aluminum are charged into a hermetic vessel, and the hermetic vessel is evacuated to vacuum after the charging of the ingredients.

The hermetic vessel that is used is one that has heat resistance and pressure resistance enough to withstand high temperatures (for example, 560° C.) and high pressures (for example, 10 MPa) and that has a hermetic space to be filled with a gas. Use may be made of a vessel at least equipped with a stirring device.

Details of the hermetic vessel will be described later.

The sodium metaborate powder is soft and most of the particles are broken into finer particles by collision during the stirring step. When the particle size is 100 μm or less, the frequency of contact with the aluminum powder during mixing is increased and consequently the reaction yield is enhanced too. It is therefore preferable that the particle size of the sodium metaborate powder be not more than 100 μm. The sodium metaborate powder tends to absorb water during storage, and the direct use thereof results in a decrease in reaction yield. Thus, the humidity during the storage of sodium metaborate is preferably not more than 10%, and the amount of water absorbed during short storage under such conditions will be 2 to 3 wt % (hereinafter, referred to as "%"). Incidentally, sodium diborate will absorb 5% or more water under the same conditions.

In the present embodiment, the sodium metaborate powder is an ingredient obtained by crushing sodium metaborate to a certain degree of fineness, screening the particles through a sieve having 100 μm openings, and collecting the particles that have passed through the sieve. To ensure good contact of sodium metaborate with aluminum, it is preferable to use sodium metaborate powder having a smaller particle size. Such sodium metaborate powder may be obtained by, for example, crushing sodium metaborate with a stirring medium in the hermetic vessel, or screening the sodium metaborate powder through a sieve having an opening size of less than 100 μm (for example, a sieve with an opening size of 50 μm or less).

At the first step, the sodium metaborate powder may be charged in a mass that is determined appropriately in accordance with the desired quantity of sodium borohydride to be synthesized. Incidentally, a larger mass than estimated needs to be added in view of the fact that crushed and dried sodium metaborate is apt to adsorb water and the mass of adsorbed water will be lost.

The aluminum used as an ingredient may be, for example, small pieces such as powder or scraps. For example, such small pieces of aluminum may be scraps such as chip scraps and wastes. Where possible, it is preferable to select aluminum containing only small amounts of impurity metals that are more noble than aluminum.

Preferably, the aluminum that is charged has an average particle size of, for example, not less than 1 μm, and a maximum particle size of not more than 10 mm. If the average particle size of the aluminum is less than 1 μm, the particles are difficult to handle due to facilitated dust explosion, and also adhere to one another easily to form aggregates in some cases. If the average particle size is larger than 10 mm, the specific surface area per mass is so reduced that the reactive area is decreased to possibly cause a significant decrease in reaction rate at the initial stage of reaction. The average particle size is more preferably not less than 10 μm and not more than 5 mm.

The average particle size is obtained as the circular equivalent diameter determined with a laser diffraction grain size distribution analyzer.

At the first step, the temperature in the hermetic vessel at the time of the addition of the ingredients is not particularly limited. No heating is particularly required in the hermetic vessel, and thus the temperature may be ambient. To prevent the reaction of sodium metaborate with water in the air, it is desirable that the ingredients be charged in a water-free atmosphere. It is necessary that the vessel be tightly closed immediately after the ingredients are charged.

Second Step (Water Removal Step)

As illustrated in FIG. 1, the second step (S-12) is a step in which the inside of the hermetic vessel is heated to not less than 280° C. and not more than 560° C., and the sodium metaborate and the aluminum are dried by the removal of residual water contained therein.

This drying step of removing residual water may be performed using any of two water removal processes.

The first water removal process causes water from the ingredients heated in the hermetic vessel to react with aluminum, thereby converting water into hydrogen gas and aluminum oxide.

Specifically, the first water removal process removes water from the reaction system by vaporizing residual water in the hermetic vessel and causing the vapor to react with aluminum.

The reaction of water with aluminum is shown by the reaction formula (1) below.

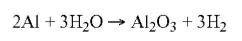

$$2Al + 3H_2O \rightarrow Al_2O_3 + 3H_2 \quad (1)$$

The second water removal process is a vacuum heating drying process in which the inside of the hermetic vessel is heated in vacuum, and water is suctioned to dehydrate the ingredients. This vacuum heating drying process can discharge much of water out of the system and can lessen the consumption of aluminum, and is therefore suited when the ingredients contain large amounts of water, although vacuum drying takes a long time.

The heating conditions at the water removal step as the second step may be 280° C. or above to ensure that the sodium metaborate hydrate will release water, and may be preferably 400° C. or above in view of the fact that the detachment of water from powdery sodium borate continues to high temperatures.

This water removal step can eliminate the influence of water present in sodium metaborate on the synthesis of sodium borohydride, thus making it possible to prevent a deterioration in the efficiency in the synthesis of sodium borohydride.

Here, the term "water" means water of hydration, water attached to the surface, and water incorporated by the reaction of an anhydrous sodium metaborate powder with water. For example, sodium metaborate may be obtained by hydrolyzing sodium borohydride. Sodium metaborate is usually a tetrahydrate, but may be a hydrate containing water of hydration in other ratio. In the present embodiment, sodium metaborate may be used regardless of whether water is attached to the surface of sodium metaborate.

Attached water is present not only on sodium metaborate but, although in a trace amount, also on the oxide film covering aluminum. These waters may be vaporized at the water removal step. According to thermogravimetric analysis, sodium metaborate at 1 atm releases water of hydration at a temperature of 280° C. Thus, as mentioned above, the heating conditions for the release of water of hydration from sodium metaborate are preferably not less than 280° C. The amount of holding time is preferably not less than 10 minutes. The release of water of hydration may be accelerated and the amount of holding time may be reduced by controlling the heating temperature to the range of not less than 300° C. and not more than 560° C.

Third Step

In the present embodiment, as illustrated in FIG. 1, the second step (S-12) described hereinabove is followed by the third step (S-13) described hereinbelow in which sodium borohydride (SBH) is synthesized. When water removal is not performed, the second step (S-12) may be omitted and the first step (S-11) may be directly followed by the third step (S-13).

Stirring for helping the sodium borohydride synthesis reaction may be performed with a stirrer alone, but preferably involves a stirring medium for promoting the contact required of aluminum and the sodium borate and the uniform mixing required of the solid ingredients with the products during the synthesis reaction.

Examples of the stirring media used here include shapes such as balls and rods, with balls being preferable. The diameter of the balls is preferably larger than the particle size of the aluminum that is charged. The materials of the milling media may be selected appropriately from existing materials such as ceramics and stainless steels. In particular, ceramic balls, which are lightweight and are free from metal contamination, are preferably used as the medium. Specifically, the ceramic balls are preferably alumina balls or mullite balls. Alumina is a product formed during the synthesis reactions, but alumina or an alumina-including ceramic that has been calcined at a high temperature is stable and does not adversely affect the synthesis reactions.

Here, the diameter of the stirring medium may be about less than 30 mm, preferably not less than 2 mm and not more than 20 mm, and more preferably not less than 3 mm and not more than 10 mm.

When stirring is performed using a stirring medium, the acceptable stirring rate may range from a low rotational speed where the stirrer's circumferential velocity is about 13 cm/sec to a high rotational speed where the stirrer has a circumferential velocity of 90 cm/sec or above and the medium gains a collision energy that can deform, and roll and mill the aluminum. If, however, the circumferential velocity is 90 cm/sec or above, the aluminum is rolled and milled to thin and elongated shapes that tend to stick to the vessel walls together with the ingredients and the products. As a result, less material is mixed and the reaction yield is lowered. Thus, the stirring rate is preferably such that the circumferential velocity of the stirrer is not more than 70 cm/sec that does not cause a deformation of aluminum. Hereinbelow, this stirring under low-speed conditions where the circumferential velocity is not more than 70 cm/sec will be referred to as "soft stirring".

In the sodium borohydride synthesis reaction in the present embodiment, the surface of the aluminum particle that lies beyond the diffusible distance in the vicinity of the aluminum surface may be taken as a coast. During mixing by stirring, the ingredients present away from the coast or offshore (at a region away from the surface of the aluminum particle, hereinafter, "offshore") diffuse through the aluminum oxide film and the reaction product layer and reach the aluminum surface that is the reaction site, and the reaction occurs between aluminum, hydrogen and sodium borate to form sodium hydride. The products, i.e., sodium borohydride and aluminum oxide, and the sodium borate ingredient have concentration gradients within the diffusible distance near the surface, and the synthesis reaction proceeds while each of these materials migrates through diffusion within the diffusible distance near the surface so as to attain an averaged concentration. The reaction rate depends on the distance and the speeds of diffusion of ions of sodium, boron, aluminum, oxygen and hydrogen. Hydrogen gas has little impact on the reaction rate because it has a small molecular size and can move quickly through the compounds to the reaction surface.

At the third step (S-13), the reaction is initiated in two mechanisms in the hermetic vessel with a hydrogen gas atmosphere.

In the first mechanism that initiates the reaction, the aluminum is scratched at the initial stage of stirring while colliding with and being caught between stirring medium balls or between a stirring medium ball and a stirrer, and the oxide film that has covered the surface is broken to expose a new aluminum surface, which is then brought into contact with dehydrated sodium metaborate and reacts therewith in the hydrogen atmosphere.

Once the surface oxide film on aluminum is broken and microscopic reaction products occur, the surface of aluminum is covered with the product and aluminum oxide containing sodium oxide.

In the second mechanism for initiating the reaction, the sodium borate ingredient includes excess sodium oxide. In this case, the sodium oxide bonds to the aluminum oxide film on the aluminum surface, and the oxide film having metal ion barrier effects is transformed into sodium aluminum dioxide ($NaAlO_2$) that passes metal ions therethrough, thus allowing the reaction to start.

The amount of hydrogen in the hermetic vessel decreases with the progress of the synthesis of sodium borohydride. The reaction rate may be increased by increasing the hydrogen gas pressure. When the ingredient is sodium metaborate, the reaction here is shown by the reaction formula (2) below.

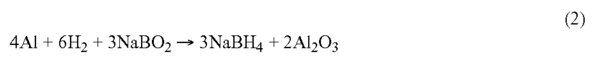

$$4Al + 6H_2 + 3NaBO_2 \rightarrow 3NaBH_4 + 2Al_2O_3 \quad (2)$$

At the third step (S-13), the hermetic vessel may be the hermetic vessel used at the first step (S-11) and the second step (S-12), or may be another hermetic vessel. That is, the first step (S-11) to the third step (S-13) may be conducted in a single hermetic vessel or in separate hermetic vessels.

At the third step (S-13), the hydrogen gas pressure is preferably maintained in the range of not less than 0.3 MPa and not more than 10 MPa, and more preferably in the range of not less than 1 MPa and not more than 10 MPa. By maintaining the hydrogen gas pressure at not less than 0.3 MPa and not more than 10 MPa, sodium borohydride may be synthesized with excellent efficiency, and facility costs may be depressed due to the freedom from the need of super-pressure-resistant reaction vessels, tools and the like.

To ensure that the reactions at the third step (S-13) will proceed to a sufficient extent, the heating temperature is preferably not less than 400° C. and not more than 560° C. Heating temperatures of not less than 400° C. and not more than 560° C. offer a sufficient reaction rate, provide excellent efficiency in the synthesis of sodium borohydride, and ensure that sodium borohydride synthesized will be prevented from decomposition and will be recovered in a sufficient rate.

Sodium borohydride (SBH) may be synthesized through the first step (S-11) to the third step (S-13) described hereinabove.

In the present embodiment discussed above, the sodium metaborate and the aluminum may be charged separately into the hermetic vessel in a sequential manner, or may be charged into the hermetic vessel as a mixture thereof.

When these ingredients are charged as a mixture, the first step (S-11) is preferably preceded by a step in which the sodium metaborate and the aluminum are mixed together to give a mixture, and the mixture of the sodium metaborate and the aluminum is preferably charged into the hermetic vessel at the first step (S-11).

By mixing aluminum and sodium metaborate beforehand and using these ingredients as the mixture, the frequency of contact between the aluminum and the sodium borate may be increased and the reaction rate may be enhanced.

When aluminum and sodium metaborate are used as a mixture, they may be dispersed and mixed together beforehand and compacted to form pellets. Pellets offer advantages such as lower hygroscopicity than the powder form and easy handling. Pellets are broken into fine particles during the course of stirring and thereafter behave similarly to powder.

While the above description has illustrated the synthesis of sodium borohydride (SBH) using powdery sodium metaborate as the sodium borate, sodium borohydride (SBH) may be synthesized by, as already described hereinabove, adding sodium hydroxide to borax as the sodium borate ingredient to form sodium metaborate, which is then formed into sodium borohydride (SBH).

Figure 2:
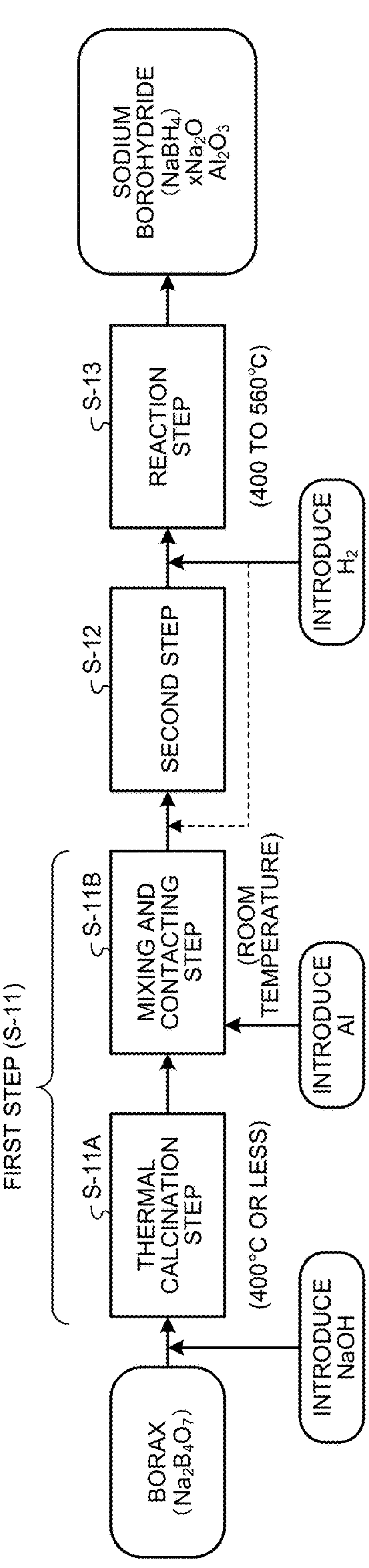
FIG. 2 is a process chart of the synthesis of sodium metaborate from borax as an ingredient and the synthesis of sodium borohydride (SBH) from the sodium metaborate as an ingredient.

FIG. 2 is a process chart of the synthesis of sodium metaborate from borax as an ingredient and the synthesis of sodium borohydride (SBH) from the sodium metaborate as an ingredient.

In this process, as illustrated in FIG. 2, the first step (S-11) includes two steps, specifically, a thermal calcination step (S-11A) in which sodium hydroxide is added to borax to form a crystal (a double oxide) of diboron trioxide ($B_2O_3$) and sodium oxide ($Na_2O$), and a mixing and contacting step (S-11B) in which the product obtained is brought into contact with aluminum by mixing. Through these two steps, a double oxide of diboron trioxide ($B_2O_3$) and sodium oxide ($Na_2O$) may be formed with a desired Na/B ratio in the range of 1.0 to 3.0 by changing the proportion of sodium hydroxide.

As listed in Table 1 hereinabove, the sodium borate with Na/B=1 is sodium metaborate ($NaBO_2$ (=$Na_2B_2O_4$)), and the sodium borate with Na/B=2 is sodium diborate ($Na_4B_2O_5$).

At the thermal calcination step (S-11A) in the first step (S-11), the heating temperature is preferably not more than 400° C. The sodium borate obtained by this thermal calcination is cooled to room temperature and is thereafter crushed. At the mixing and contacting step (S-11B), aluminum is introduced and brought into contact with the sodium borate by mixing at room temperature.

After these steps, water is removed at the second step (S-12) in the similar manner as described hereinabove, and sodium borohydride (SBH) is synthesized at the third step (S-13) in the similar manner as described hereinabove.

The resultant products include sodium borohydride (SBH), and sodium oxide ($Na_2O$), aluminum oxide ($Al_2O_3$) and sodium hydride.

Next, some examples of the hermetic vessels that may be used in the present embodiment will be described, but the hermetic vessels in the present embodiment are not limited thereto.

Figure 3:
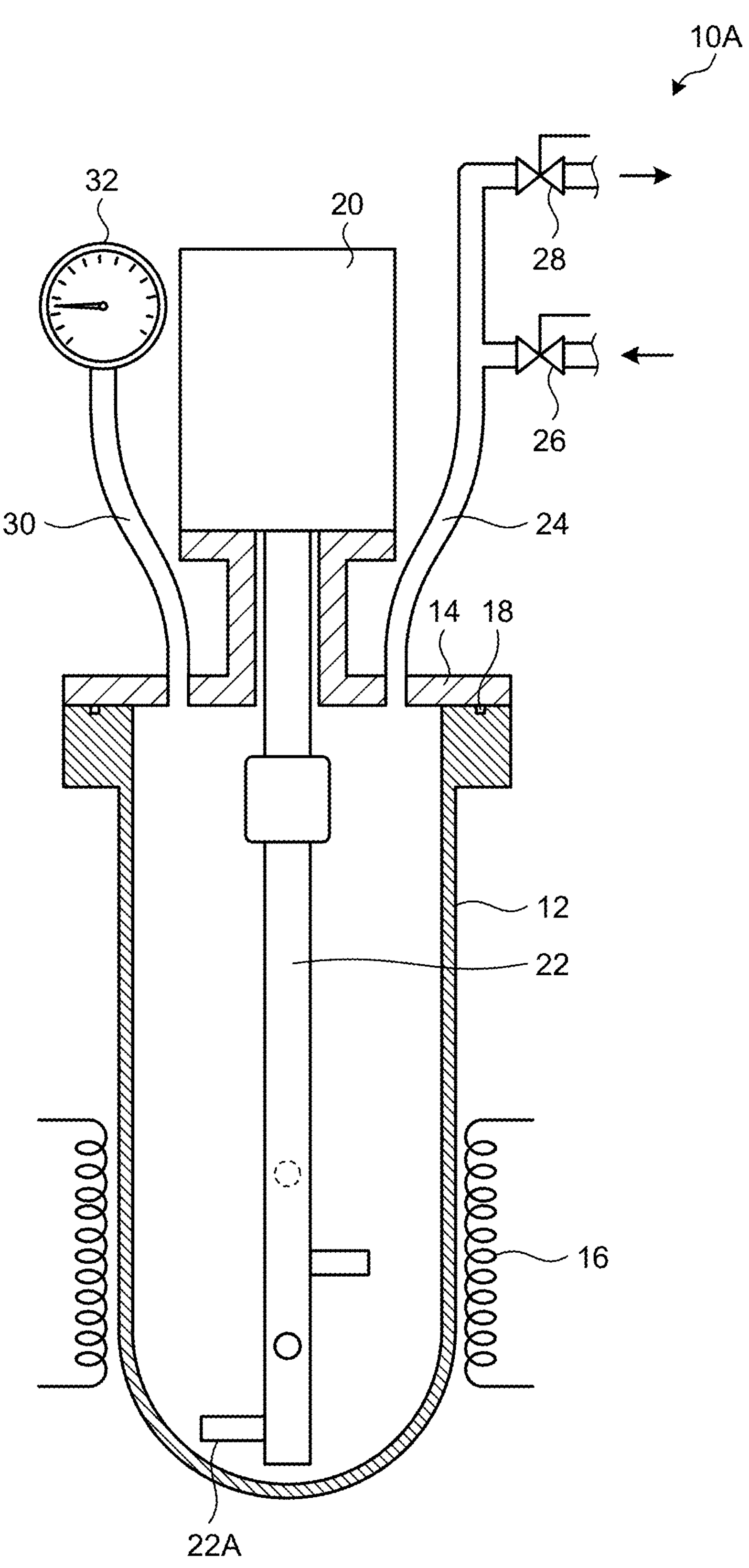
FIG. 3 is a partial sectional view illustrating an example of hermetic vessels used in an embodiment.

FIG. 3 is a partial sectional view illustrating an example of the hermetic vessels used in the present embodiment.

As illustrated in FIG. 3, a hermetic vessel 10A has a round-bottomed cylindrical main vessel body 12, and a detachable disk-shaped cover 14 that tightly seals the main vessel body 12. A temperature-adjustable heater 16 is disposed at a lower outside portion of the main vessel body 12, and the content in the main vessel body 12 is heated with the heater 16. Furthermore, an O-ring 18 is disposed in the upper end face of the main vessel body 12, and ensures airtightness inside the vessel by being placed into intimate contact with the cover 14. When the cover 14 is closed, the cover 14 is in close contact with the main vessel body 12 via the O-ring 18.

The cover 14 has a central opening and a cylindrical portion extending along the opening. A motor 20 is disposed above the cylindrical portion. A stirring device is composed of the motor 20, a stirring rod 22 connected to the rotating shaft of the motor 20, and a plurality of stirrer portions 22A extending in a direction perpendicular to the axis of the stirring rod 22. When the cover 14 is attached to the main vessel body 12, the tip of the stirring rod 22 reaches a lower region in the space inside the main vessel body 12. That is, the motor 20 being driven rotates the stirring rod 22 together with the stirrer portions 22A to stir the content in the main vessel body 12.

The cover 14 is further equipped with a first pipe 24 and a second pipe 30 that are continuous to the inside of the main vessel body 12. The first pipe 24 is connected to a hydrogen gas supply source (not shown) via a hydrogen gas supply valve 26, and to a vacuum pump (not shown) via a discharge valve 28. That is, hydrogen gas is supplied into the main vessel body 12 when the hydrogen gas supply valve 26 is open, and the main vessel body 12 is evacuated when the discharge valve 28 is open. Furthermore, the second pipe 30 is connected to a pressure gauge 32, and the pressure inside the main vessel body 12 is displayed on the pressure gauge 32.

Figure 4:
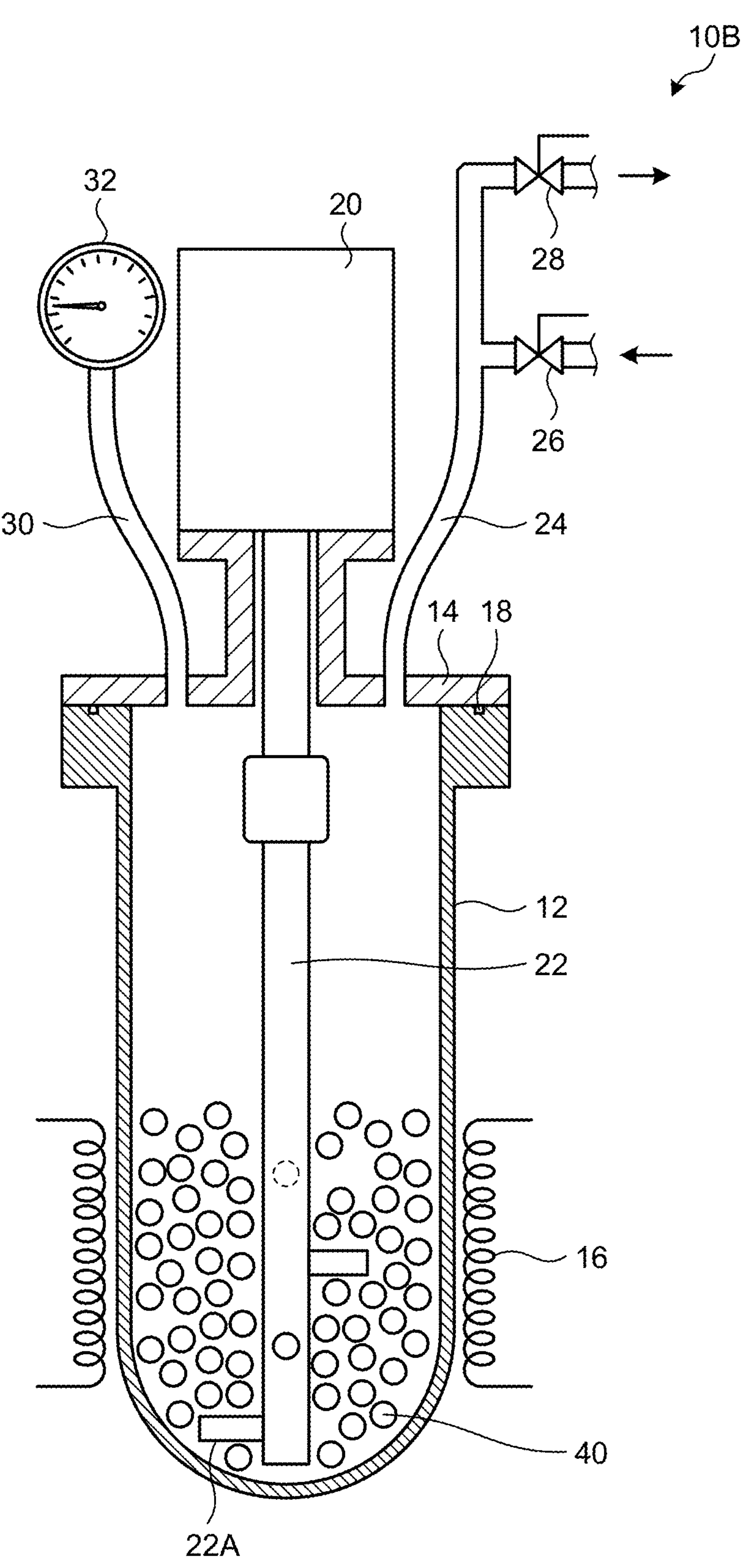
FIG. 4 is a partial sectional view illustrating another example of hermetic vessels used in an embodiment.

FIG. 4 is partial sectional views illustrating other examples of the hermetic vessels that may be used in the present embodiment.

A hermetic vessel 10B differs from the hermetic vessel in FIG. 3 in that, as illustrated in FIG. 4, the hermetic vessel 10B contains a large amount of a stirring medium 40 inside the main vessel body 12. When the ingredients are charged into the main vessel body 12 and the stirring rod 22 is rotated, the stirring medium 40 is stirred to promote the migration of the sodium borate ingredient and the sodium hydride intermediate. The amount of the stirring medium 40 may be appropriately increased or decreased so that the reaction rate will be increased.

Here, the weight ratio of the stirring medium 40 to the ingredients is preferably not less than 1 and less than 110.

Figure 5A:
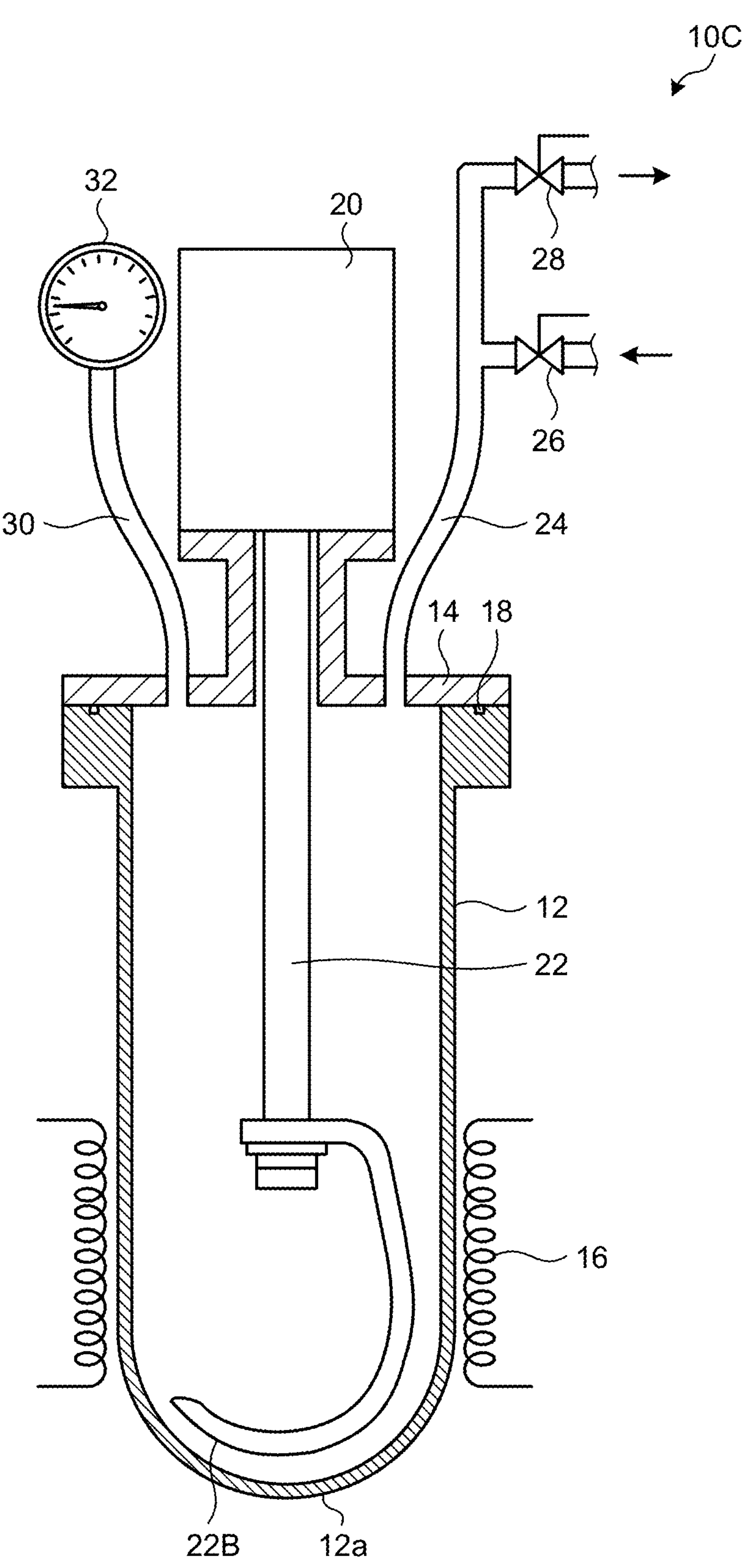
FIG. 5A is a partial sectional view illustrating another example of hermetic vessels used in an embodiment.

FIG. 5A is a partial sectional view illustrating another example of the hermetic vessels that may be used in the present embodiment.

Figure 5B:
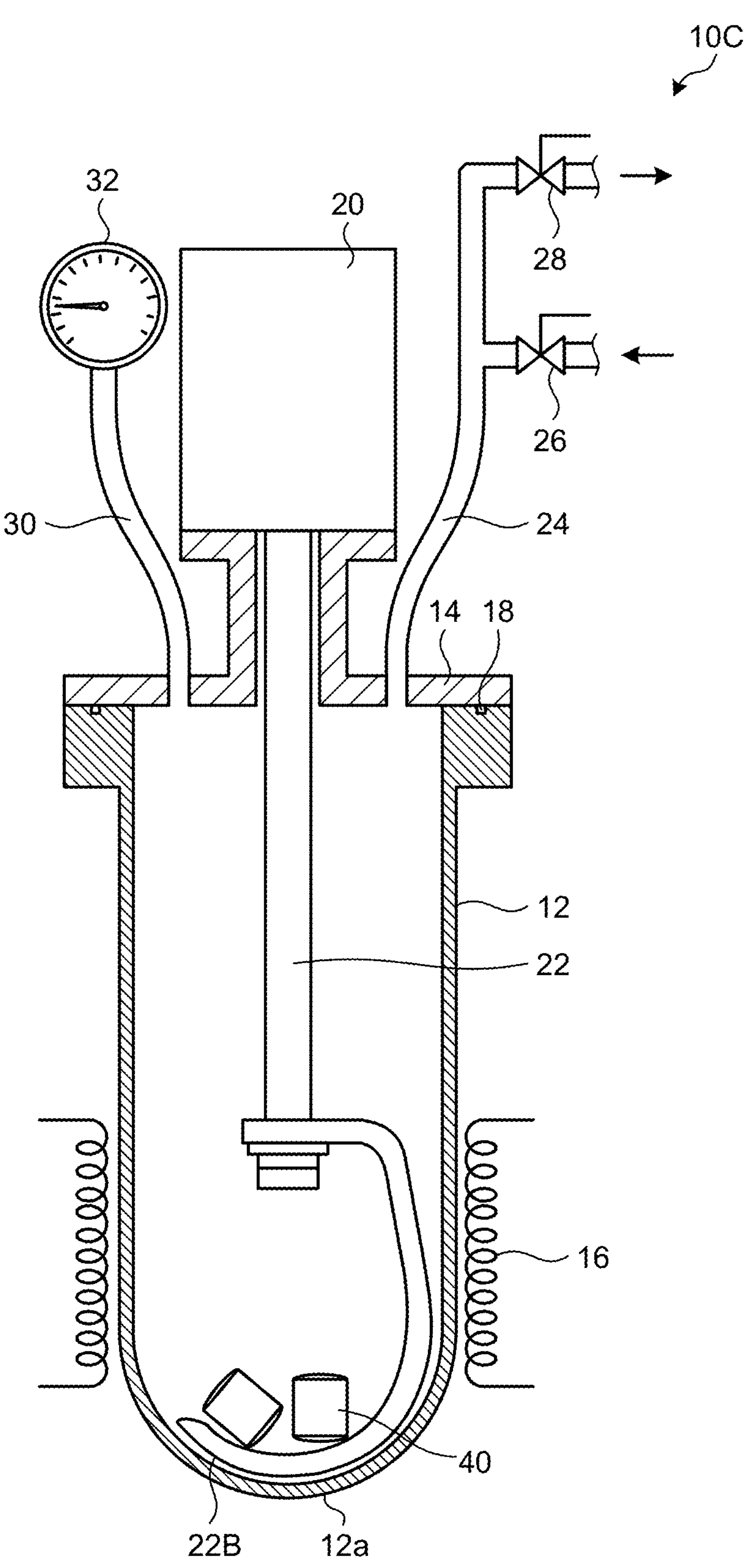
FIG. 5B is a partial sectional view illustrating another example of hermetic vessels used in an embodiment.

A hermetic vessel 10C differs from the hermetic vessel in FIG. 3 in that, as illustrated in FIG. 5A, the hermetic vessel 10C has a J-shaped stirrer portion 22B at the lower end of the stirring rod 22 that rotates inside the main vessel body 12. The J-shaped stirrer portion 22B is curved along the inner peripheral face of a bottom 12*a* of the main vessel body 12. When the ingredients are charged into the main vessel body 12 and the stirring rod 22 is rotated, the ingredients have a smaller chance of becoming attached to the inner vessel walls during stirring by virtue of the stirrer portion 22B being curved in J-shape along the inner peripheral face of the bottom 12*a*. A stirring medium 40 such as one illustrated in FIG. 4 may be added appropriately. In the hermetic vessel 10C as illustrated in FIG. 5B, two stirring medium 40 are added inside the main vessel body 12.

Second Embodiment

A sodium borohydride production method in the second embodiment includes the first step to the third step described in the sodium borohydride production method in the first embodiment. The description of features of the steps that are the same as in the first embodiment will be omitted, and features differing from the first embodiment will be described.

At the first step in the sodium borohydride production method according to the second embodiment, an alkali metal hydroxide or an alkali metal oxide is further charged into the hermetic vessel. At the second step, the mixture of the sodium borate powder, the aluminum powder and the alkali metal hydroxide is dehydrated by reaction in the hermetic vessel filled with hydrogen gas at not less than 400° C. and not more than 560° C. Alternatively, the ingredients are dehydrated by heating under vacuum suction, and thereafter at the third step, the sodium metaborate powder, the aluminum powder and the alkali metal oxide are mixed together in the hermetic vessel filled with hydrogen gas and the mixture is reacted at not less than 400° C. and not more than 560° C.

Examples of the alkaline metal hydroxides include sodium hydroxide (NaOH), potassium hydroxide (KOH) and lithium hydroxide (LiOH).

Examples of the alkaline metal oxides include sodium oxide ($Na_2O$), lithium oxide ($Li_2O$), sodium aluminum dioxide ($NaAlO_2$), calcium oxide (CaO) and strontium oxide (SrO). Calcium oxide may be added to increase the alkalinity.

When sodium hydroxide (NaOH) is used as the alkaline metal hydroxide, the sodium hydroxide consumes aluminum and supplies hydrogen in the hermetic vessel as shown in the reaction formula (3) below. Thus, it is preferable that the amount of aluminum added be increased to compensate for the loss of aluminum by this consumption.

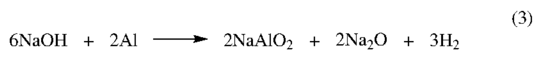

(3)

The sodium borohydride production method of the second embodiment that involves the introduction of a metal hydroxide (for example, NaOH) can produce sodium borohydride largely in two manners. When use is made of a metal oxide (for example, CaO), the method is preferably performed in the first manner because its water content is small.

Hereinbelow, a method for producing sodium borohydride with introduction of a metal hydroxide (for example, NaOH) will be described with reference to FIG. 6 and FIG. 7.

Figure 6:
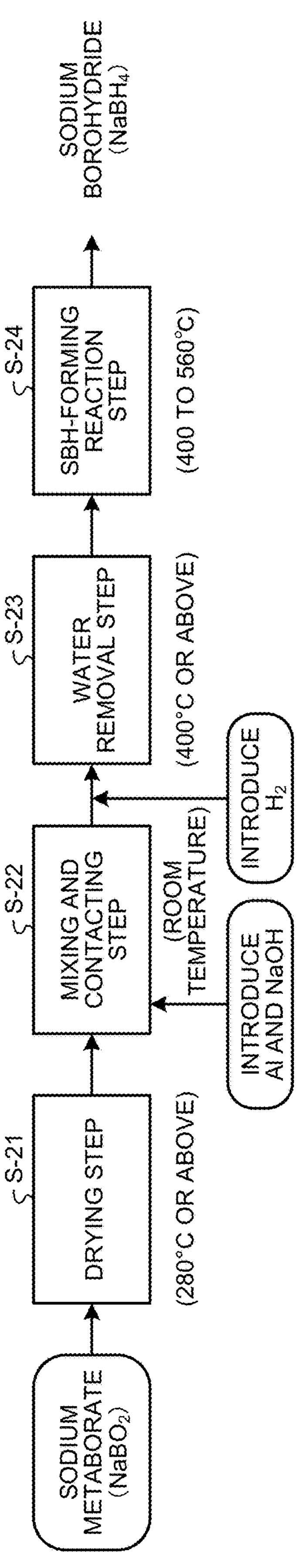
FIG. 6 is a process chart of the synthesis of sodium borohydride (SBH) from sodium metaborate as an ingredient involving water removal in a hydrogen atmosphere.

FIG. 6 is a process chart of the synthesis of sodium borohydride (SBH) from sodium metaborate as an ingredient involving water removal in a hydrogen atmosphere.

Figure 7:
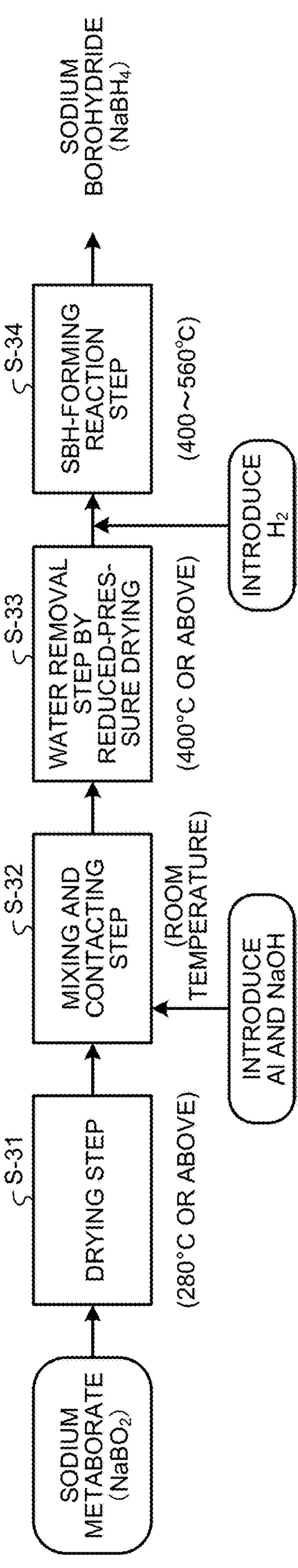
FIG. 7 is a process chart of the synthesis of sodium borohydride (SBH) from sodium metaborate as an ingredient involving water removal by drying under reduced pressure without hydrogen introduction followed by reaction in a hydrogen atmosphere.

FIG. 7 is a process chart of the synthesis of sodium borohydride (SBH) from sodium metaborate as an ingredient involving water removal by drying under reduced pressure without hydrogen introduction followed by reaction in a hydrogen atmosphere.

As illustrated in FIG. 6, the first method for producing sodium borohydride according to the second embodiment includes a drying step (S-21) in which sodium metaborate is dried at 280° C. or above, a mixing and contacting step (S-22) in which an alkali metal hydroxide, a sodium borate and aluminum are brought into contact and mixed together with the dried borate at room temperature, a water removal step (S-23) in which the contacted mixture is reacted while being dehydrated in a static condition at not less than 400° C. in a hydrogen gas atmosphere, thereby removing water, and an SBH-forming step (S-24) in which the aluminum particles are subjected to oxidation reaction with water generated in the water removal step (S-23) to form a sodium aluminum oxide layer represented by the chemical formula (I) below that extends from the surface toward the inside of the aluminum particles, and thereafter the mixture is reacted at a temperature of not less than 400° C. and not more than 560° C. while performing stirring to form sodium borohydride (SBH).

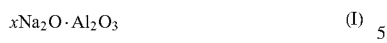

(I)

Here, $0 < x < 1$.

Furthermore, as illustrated in FIG. 7, the second method for producing sodium borohydride according to the second embodiment includes a drying step (S-31) in which sodium metaborate is dried at 280° C. or above, a mixing and contacting step (S-32) in which an alkali metal hydroxide, a sodium borate and aluminum are brought into contact and mixed together with the dried borate at room temperature, a water removal step (S-33) by reduced-pressure drying in which the mixture is heated at not less than 400° C. under a reduced pressure and is reacted while being dehydrated in a static condition, thereby removing water, and an SBH-forming step (S-34) in which the aluminum particles are subjected to oxidation reaction with water generated in the water removal step (S-33) to form a sodium aluminum oxide layer represented by the chemical formula (I) below that extends from the surface toward the inside of the aluminum particles, and thereafter the mixture is reacted at a temperature of not less than 400° C. and not more than 560° C. while performing stirring in a hydrogen gas atmosphere to form sodium borohydride (SBH).

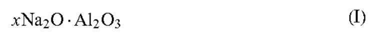

(I)

Here, $0 < x < 1$.

In the second method for producing sodium borohydride according to the second embodiment illustrated in FIG. 7, water is expelled first out of the system by drying under reduced pressure. Thus, this second method is suited when the ingredients contain much water (for example, 2% or more). When dehydration relies on only metallic aluminum as is the case in the first sodium borohydride production method of the second embodiment illustrated in FIG. 6, the ingredients are not completely dehydrated when the amount of water is large (for example, 10% or more). In this case, the second method is preferable.

Here, the first method for producing sodium borohydride according to the second embodiment illustrated in FIG. 6 will be further described. Water from the alkali metal hydroxide is heated to a reaction temperature and is removed by being reacted with aluminum for at least 10 minutes in a condition free from collision with a medium while maintaining the reaction temperature. Hereinafter, this dehydration will be referred to as "reactive dehydration".

Hereinbelow, the dehydration will be described taking sodium hydroxide (NaOH) as a typical example of the alkali metal hydroxides. When water generated from sodium hydroxide is held at a high temperature in a condition free from collision with a stirring medium, it reacts with aluminum to produce hydrogen. The aluminum oxide that occurs here is coordinated to sodium oxide ($Na_2O$) that is a metal oxide produced at the same time and neutralizes the sodium oxide to form sodium aluminum dioxide ($NaAlO_2=Na_2O.Al_2O_3$). When held at a high temperature in a static condition, this dioxide releases sodium oxide ($Na_2O$) so as to be stable β"-alumina ($0.17Na_2O.Al_2O_3$) or β-alumina ($0.09Na_2O.Al_2O_3$), resulting in $xNa_2O.Al_2O_3$ ($0.09<x<1$). As a result of crystallization, $xNa_2O.Al_2O_3$ has a more stable structure than sodium aluminum dioxide and attains high strength due to strong $Al_2O_3$ bonds. Hereinafter, this $xNa_2O.Al_2O_3$ layer with increased strength will be referred to as the "hard shell".

Here, sodium aluminum oxide layers ($xNa_2O.Al_2O_3$; $0<x<1$) composed of β"-alumina ($0.17Na_2O.Al_2O_3$) or β-alumina ($0.09Na_2O.Al_2O_3$) are called beta-alumina solid electrolytes. The beta-alumina solid electrolytes are super ion conductors that have sodium ions distributed between two-dimensional layers made of alumina blocks, and the sodium ions move at high speed between the layers.

The sodium aluminum dioxide layer immediately after formed is soft. This soft sodium aluminum dioxide layer will be referred to as the "soft shell". When medium stirring is performed, the soft shell is detached from the aluminum particles even under soft stirring conditions.

The sodium aluminum dioxide detached from the aluminum particles is small and is placed in a place of high kinematic energy, and is therefore less prone to undergo β-alumina crystallization, releasing little sodium oxide. Even if released, sodium oxide is remote from the aluminum surface and cannot benefit from the reduction effect of aluminum.

The purpose of adding an alkali hydroxide resides in increasing the amount of the metal oxide (sodium oxide ($Na_2O$)) on the aluminum surface, and it is therefore preferable that the mixture be held at the heating temperature without stirring until dehydration completes.

The hard shell obtained by reactive dehydration protects the reactive site of the aluminum surface from soft stirring. Furthermore, the β"-alumina hard shell ($xNa_2O.Al_2O_3$) has good ion permeability and allows sodium, boron, aluminum, oxygen and hydrogen ions to move within the hard shell through diffusion. In particular, sodium ions can move at a high migration speed. At the aluminum interface where the reduction reaction occurs, sodium oxide ($Na_2O$) released from the sodium aluminum dioxide as a result of the progress of β"-alumina formation and β-alumina formation is reduced by aluminum into metallic sodium. The resultant metallic sodium in aluminum has a low solid solubility and accumulates at the surface and defects such as crystal grain boundaries.

The metallic sodium present on the aluminum surface reduces hydrogen gas, and the metallic sodium accumulated at aluminum defects reduces hydrogen atoms, thus forming sodium hydride (NaH). The sodium hydride easily passes through the hard shell and is diffused into and out of the hard shell. When boron oxide ($B_2O_3$) is diffused to the vicinity of sodium hydride (NaH), the sodium hydride is deprived of hydrogen (hydride) by the boron oxide to form sodium borohydride (SBH) as shown in the reaction formula (4) below.

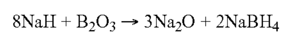

$$8NaH + B_2O_3 \rightarrow 3Na_2O + 2NaBH_4 \quad (4)$$

This reduction reaction gives sodium borohydride, and part returns to sodium oxide. The migration in the hard shell is mainly of sodium ions, but a small amount of boron ions moves into the hard shell to give rise to the sodium borohydride-forming reaction within the hard shell too. The sodium oxide required for the reaction is supplied from outside through the hard shell, and the reaction proceeds in a continuous manner.

The reduction reaction occurs at regions in the aluminum that are rich in metallic sodium, and thus proceeds on the aluminum surface and at crystal defects in the aluminum. Meanwhile, the substitution reaction proceeds over a wide range of regions as a result of the migration of sodium hydride.

Here, the reactions will be described in detail with reference to schematic reaction views (FIG. 8A to FIG. 8G) illustrating steps in the reactions for forming sodium borohydride (SBH) using sodium hydroxide (NaOH) as the alkali hydroxide to generate an increased amount of the metal oxide (sodium oxide ($Na_2O$)).

FIG. 8A to FIG. 8G are schematic reaction views illustrating steps in sodium borohydride (SBH) synthesis reaction.

Figure 8A:
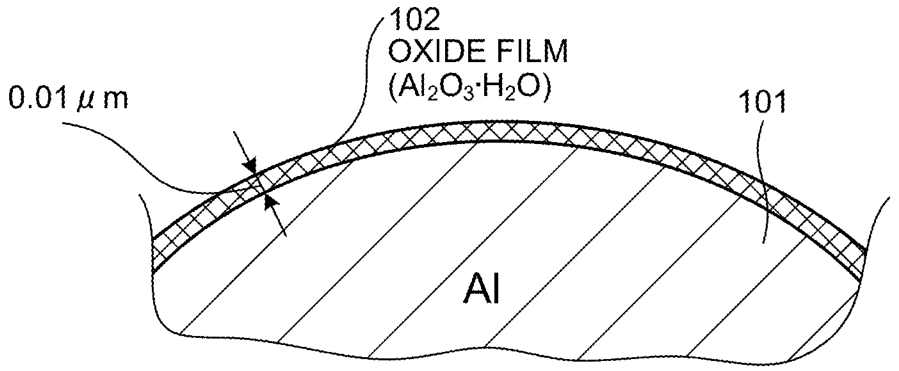
FIG. 8A is a schematic reaction view illustrating a step in sodium borohydride (SBH) synthesis reaction.

On the surface of an aluminum (Al) particle 101, as illustrated in FIG. 8A, there is an oxide film ($Al_2O_3.H_2O$) 102 formed by natural oxidation. This oxide film 102 resulting from natural oxidation is a dense layer with a thickness of about 0.01 μm.

Figure 8B:
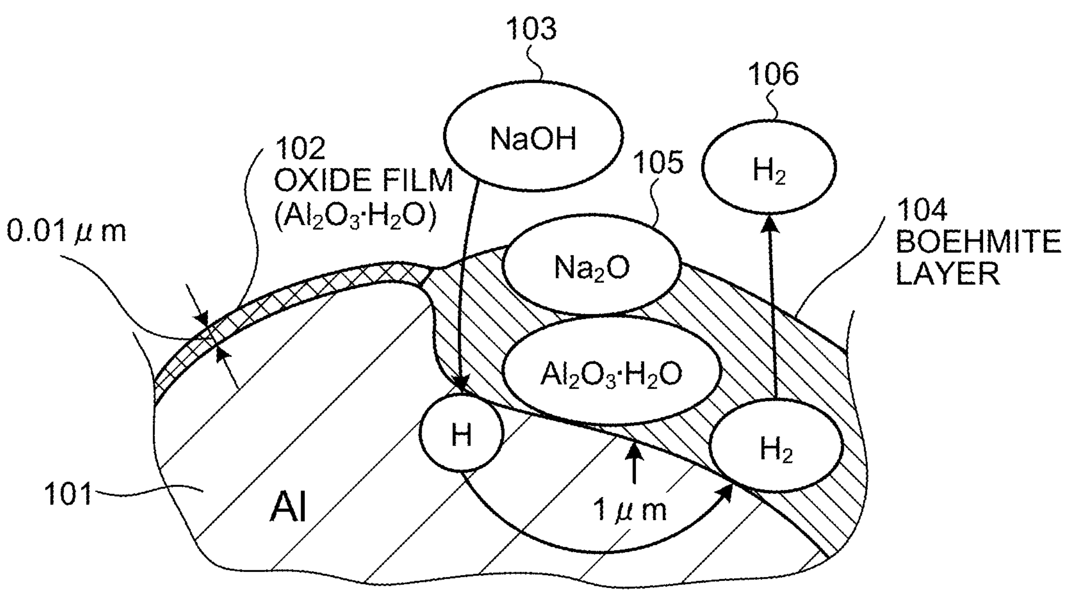
FIG. 8B is a schematic reaction view illustrating a step in sodium borohydride (SBH) synthesis reaction.

As illustrated in FIG. 8B, the oxide film ($Al_2O_3.H_2O$) 102 on the surface of the aluminum particle 101 is dissolved with water generated from sodium hydroxide (NaOH) 103 and with sodium hydroxide (NaOH) 103. As a result of this dissolution, sodium hydroxide (NaOH) comes to react directly with the surface (the newly exposed surface) of the aluminum particle 101.

When the aluminum particle 101 is heated and the temperature is in a low range of 300° C. and below, oxidation is caused to proceed by water generated from sodium hydroxide (NaOH) 103, and aluminum reacts with sodium hydroxide as shown in the reaction formula (5) below to form a soft boehmite ($Al_2O_3.xH_2O$) layer 104, sodium oxide ($Na_2O$) 105 and hydrogen ($H_2$) 106.

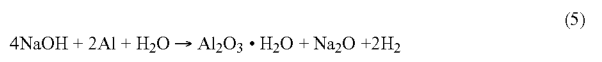

$$4NaOH + 2Al + H_2O \rightarrow Al_2O_3 \cdot H_2O + Na_2O + 2H_2 \quad (5)$$

The boehmite ($Al_2O_3.H_2O$) layer 104 releases most of its water at 230° C. to 300° C. or about 500° C. Incidentally, sodium hydroxide (NaOH) melts at about 320° C. and reacts directly with aluminum (Al) to form $Na_2O$, $Al_2O_3$ and $H_2$.

Figure 8C:
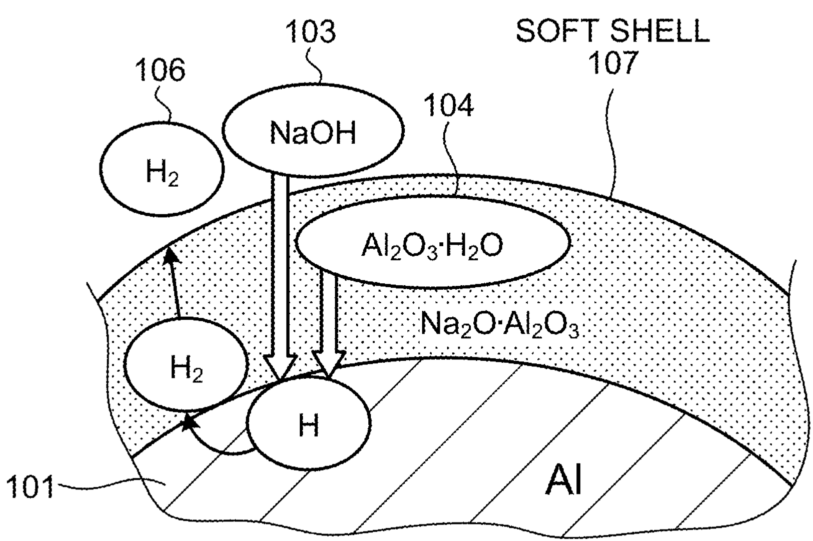
FIG. 8C is a schematic reaction view illustrating a step in sodium borohydride (SBH) synthesis reaction.

As illustrated in FIG. 8C, sodium oxide ($Na_2O$) 105 and aluminum oxide ($Al_2O_3$) bond together as shown in the reaction formulae (6) to (9) below to form a soft shell 107 composed of sodium aluminum dioxide ($Na_2O.Al_2O_3$).

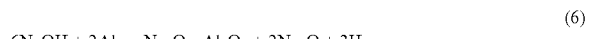

$$6NaOH + 2Al \rightarrow Na_2O \cdot Al_2O_3 + 2Na_2O + 3H_2 \quad (6)$$

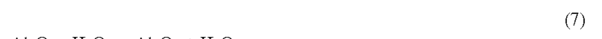

$$Al_2O_3 \cdot H_2O \rightarrow Al_2O_3 + H_2O \quad (7)$$

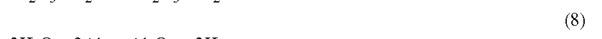

$$3H_2O + 2Al \rightarrow Al_2O_3 + 3H_2 \quad (8)$$

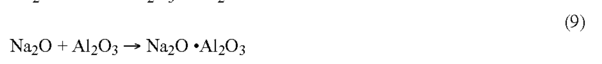

$$Na_2O + Al_2O_3 \rightarrow Na_2O \cdot Al_2O_3 \quad (9)$$

Figure 8D:
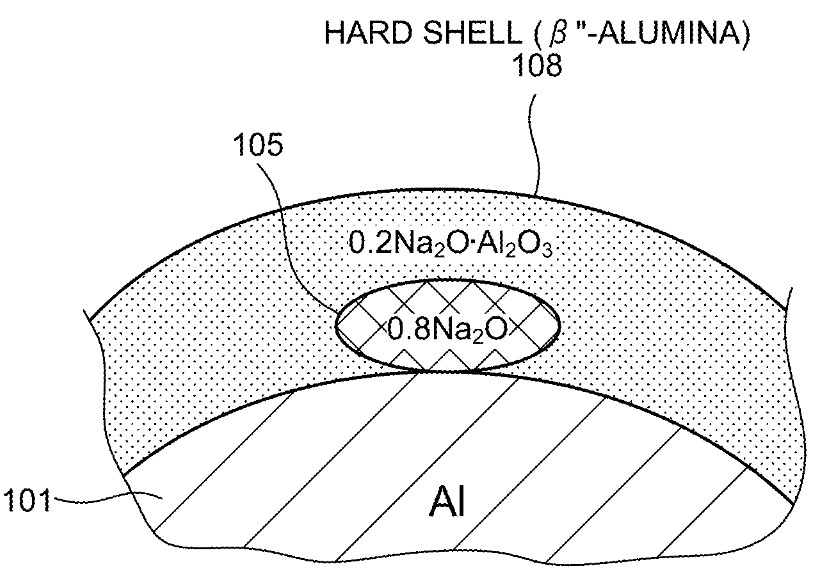
FIG. 8D is a schematic reaction view illustrating a step in sodium borohydride (SBH) synthesis reaction.

As illustrated in FIG. 8D, the soft shell layer 107 composed of sodium aluminum dioxide ($Na_2O.Al_2O_3$) is gradually transformed into beta-prime alumina (β"-alumina) $0.17Na_2O.Al_2O_3$ by being heated at a high temperature of not less than 400° C. over time. During the formation of this beta-alumina, the soft shell releases part of $Na_2O$ ($0.8Na_2O$) 105 and forms a hard shell 108 composed of β"-alumina. The hard shell 108 resulting from the β"-alumina formation is a super ion conductive solid electrolyte that is permeable to ions such as, for example, $H^+$, $Na^+$, $O^{2-}$, $B^{3+}$ and $Al^{3+}$.

Figure 8E:
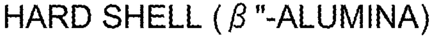
FIG. 8E is a schematic reaction view illustrating a step in sodium borohydride (SBH) synthesis reaction.
Figure 8E:
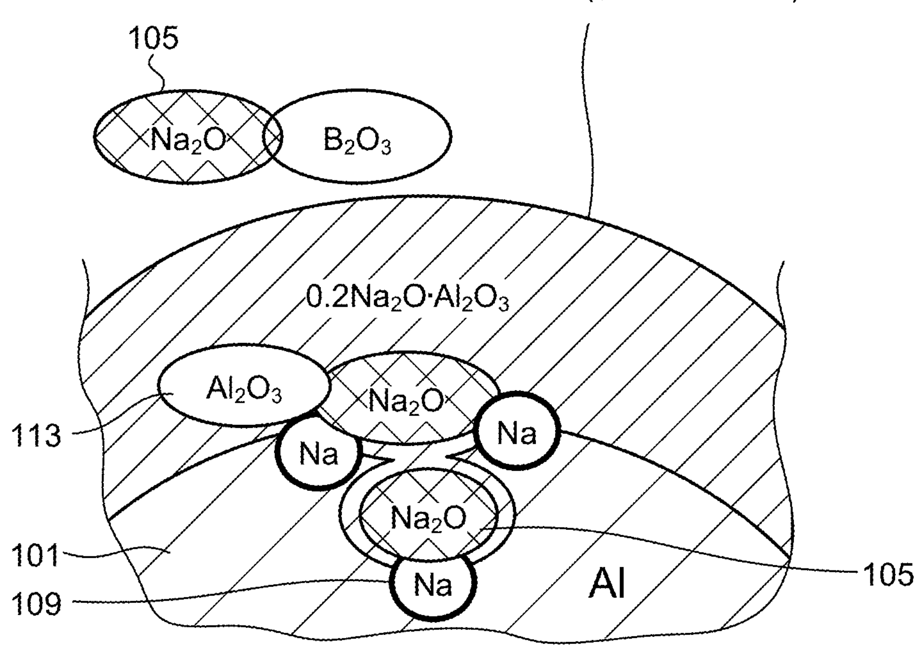

As illustrated in FIG. 8E, the released portion of sodium oxide ($Na_2O$) 105 is brought into contact with aluminum and is partially reduced by aluminum to form metallic sodium (Na) 109 and aluminum oxide ($Al_2O_3$). The aluminum oxide bonds to sodium oxide to form sodium aluminum dioxide, which is thereafter formed into β"-alumina. The metallic sodium (Na) 109 has a low solid solubility in aluminum and accumulates at the aluminum surface and the crystal defects.

Figure 8F:
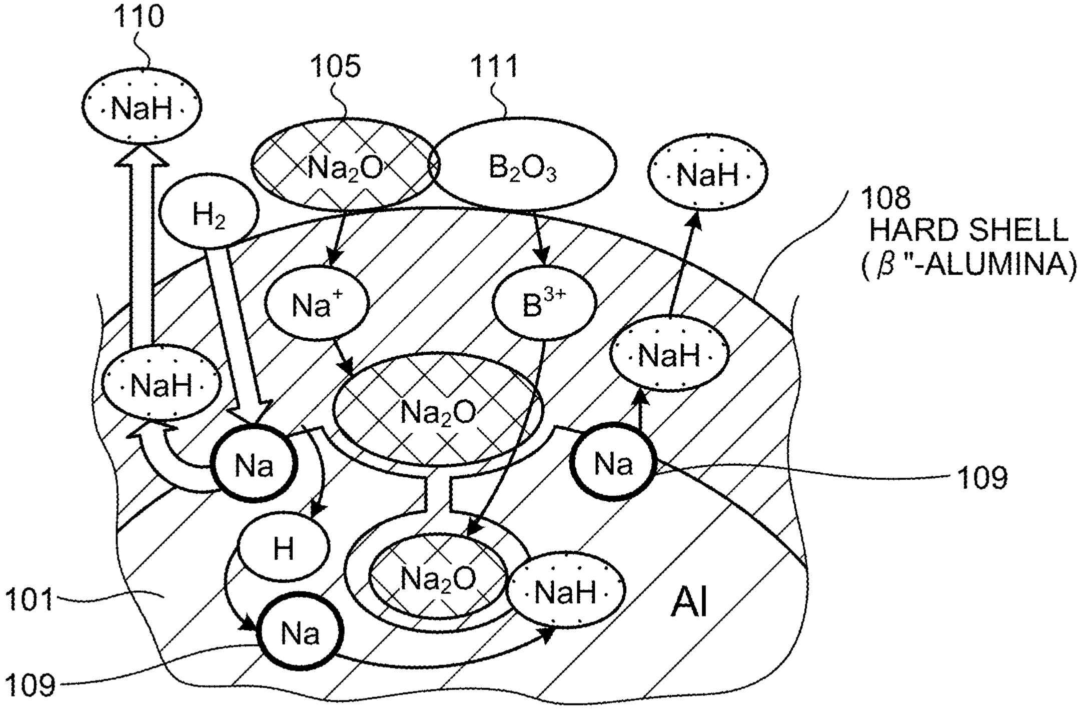
FIG. 8F is a schematic reaction view illustrating a step in sodium borohydride (SBH) synthesis reaction.

As illustrated in FIG. 8F, hydrogen gas ($H_2$) passes through the β"-alumina hard shell 108 and is dissociated into hydrogen atoms, which then advance to the inside of the aluminum particle 101. The hydrogen atoms react with metallic sodium (Na) 109 that is enriched near the aluminum surface and at the aluminum crystal defects, thus forming sodium hydride (NaH) 110. The resultant sodium hydride (NaH) 110 leaves the aluminum particle 101 into the products phase, and is diffused through the products phase. Furthermore, sodium hydride (NaH) 110 accumulates and remains also at the crystal defects in the aluminum (Al) particle 101.

Figure 8G:
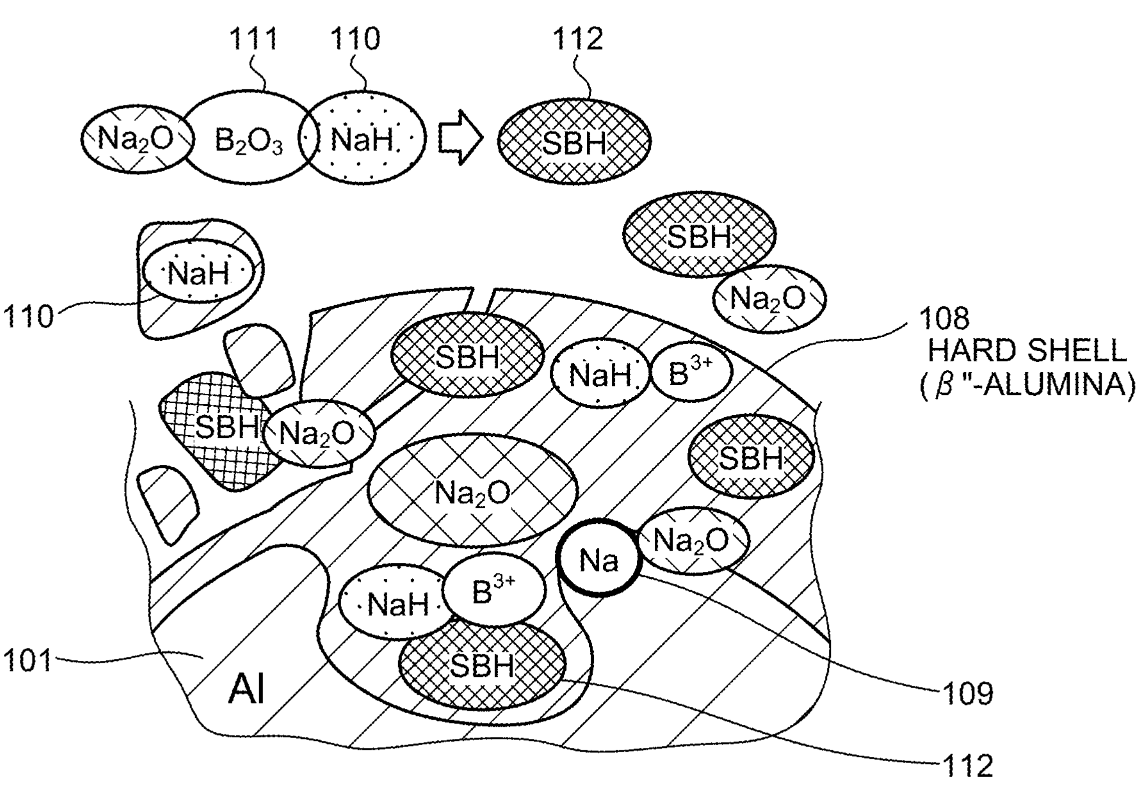
FIG. 8G is a schematic reaction view illustrating a step in sodium borohydride (SBH) synthesis reaction.

As illustrated in FIG. 8G, the sodium hydride (NaH) 110 reacts with diboron trioxide ($B_2O_3$) 111 to form sodium borohydride (SBH) 112 and sodium oxide ($Na_2O$) 105. Furthermore, the sodium hydride (NaH) accumulated at the crystal defects within the aluminum particle 101 reacts with diboron trioxide ($B_2O_3$) 111 diffused thereto, thus forming sodium borohydride (SBH) 112 and sodium oxide ($Na_2O$) 105.

Furthermore, the sodium hydride (NaH) 110 that is being diffused within the β"-alumina hard shell 108 meets diboron trioxide ($B_2O_3$) 111 and reacts therewith to form sodium borohydride (SBH) 112 and sodium oxide ($Na_2O$) 105.

As described above, sodium hydride (NaH) 110 undergoes the reaction at the surface and in the inside of the aluminum (Al) particle 101, and also in the products phase. The reaction product pools at crystal grain boundaries and defects in the aluminum (Al) particle 101 where sodium hydride (NaH) is enriched. The microstructure of the aluminum (Al) particle 101 is sometimes divided into fine segments by the reaction product formed within the β"-alumina hard shell 108.

Sodium hydride (NaH) has a small molecular size and can be diffused more easily than diboron trioxide ($B_2O_3$) Thus, sodium hydride, although being in a solid state, can move out of the aluminum (Al) particle 101 and offshore (a region away from the surface of the aluminum particle) in search of reaction sites where the ingredient still remains. As a result, the reaction rate and the reaction yield are enhanced.

Figure 9A:
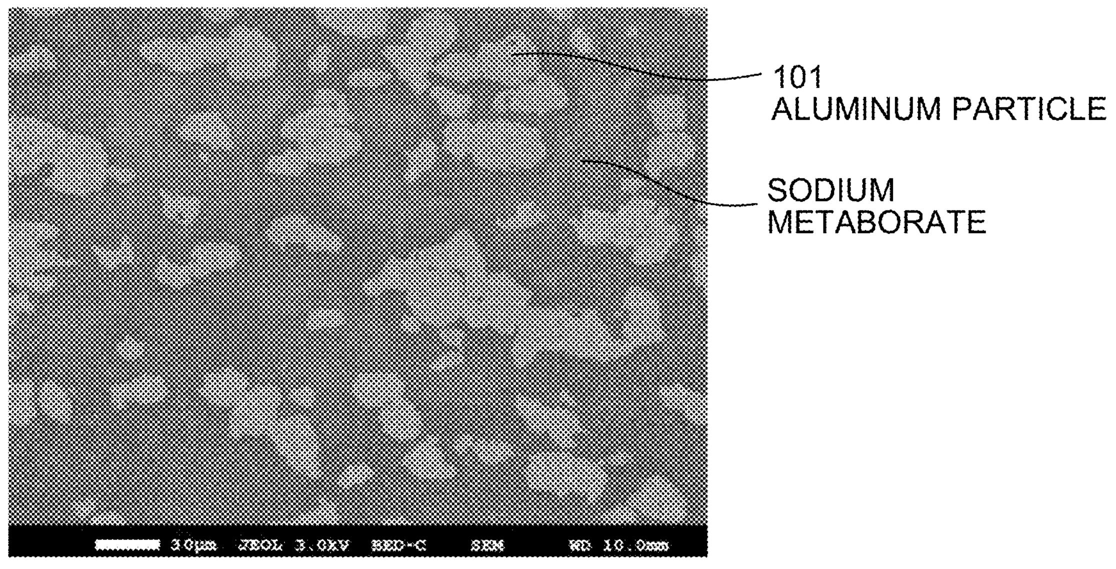
FIG. 9A is an image illustrating the result of SEM mapping analysis of a pellet prepared by mixing sodium metaborate and aluminum.

FIG. 9A is an image illustrating the result of SEM mapping analysis of a pellet prepared by mixing sodium metaborate and aluminum. Here, the pellet of sodium metaborate and aluminum has Na/B=1 and an Al particle size of 30 μm. As illustrated in FIG. 9A, aluminum particles 101 are slightly flattened grains, and sodium metaborate forms a uniform structure.

Figure 9B:
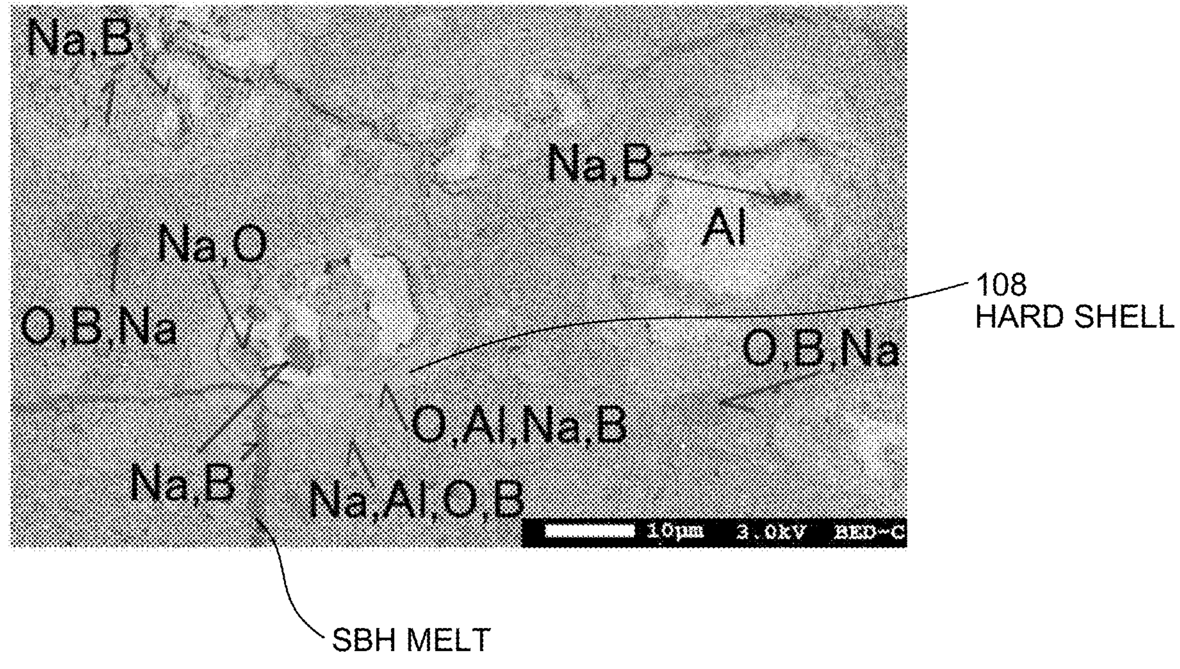
FIG. 9B is a backscattered electron image captured in the course of reaction in Test Example 12 involving the addition of sodium hydroxide, together with the result of SEM mapping analysis.

FIG. 9B is a backscattered electron image captured in a portion indicating the course of reaction in Test Example 12 described later that involved the addition of sodium hydroxide, together with the result of SEM mapping analysis. The magnification is about 3 times the size of FIG. 9A.

In FIG. 9B, Na, B is probably $NaBH_4$ (SBH); O, B, Na is probably sodium metaborate ($NaBO_2$); Na, Al, B, O is probably $NaBH_4$ (SBH)+sodium oxide ($Na_2O$)+diboron trioxide ($B_2O_3$)+aluminum oxide ($Al_2O_3$); O, Al, Na, B is probably aluminum oxide ($Al_2O_3$)+sodium oxide ($Na_2O$)+ diboron trioxide ($B_2O_3$)+$NaBH_4$ (SBH); and Na, O is probably sodium oxide ($Na_2O$).

As illustrated in FIG. 9B, a hard shell 108 is formed in an aluminum particle 101 illustrated in FIG. 8D hereinabove, and the reaction that synthesizes sodium borohydride (SBH) proceeds within the hard shell 108. The image shows that in the inside of the hard shell 108, part of sodium oxide ($Na_2O$) ($0.8Na_2O$) 105 has been released and has formed sodium borohydride (SBH) 112.

Furthermore, sodium borohydride (SBH) 112 is molten at the reaction temperature (near 500° C.), and the melts combine together. This sodium borohydride (SBH) 112 that is the collection of melts gathers in a crack in the aluminum particle 101. Furthermore, the reaction proceeds along this crack, and the reaction yield of the product is increased.

Figure 9C:
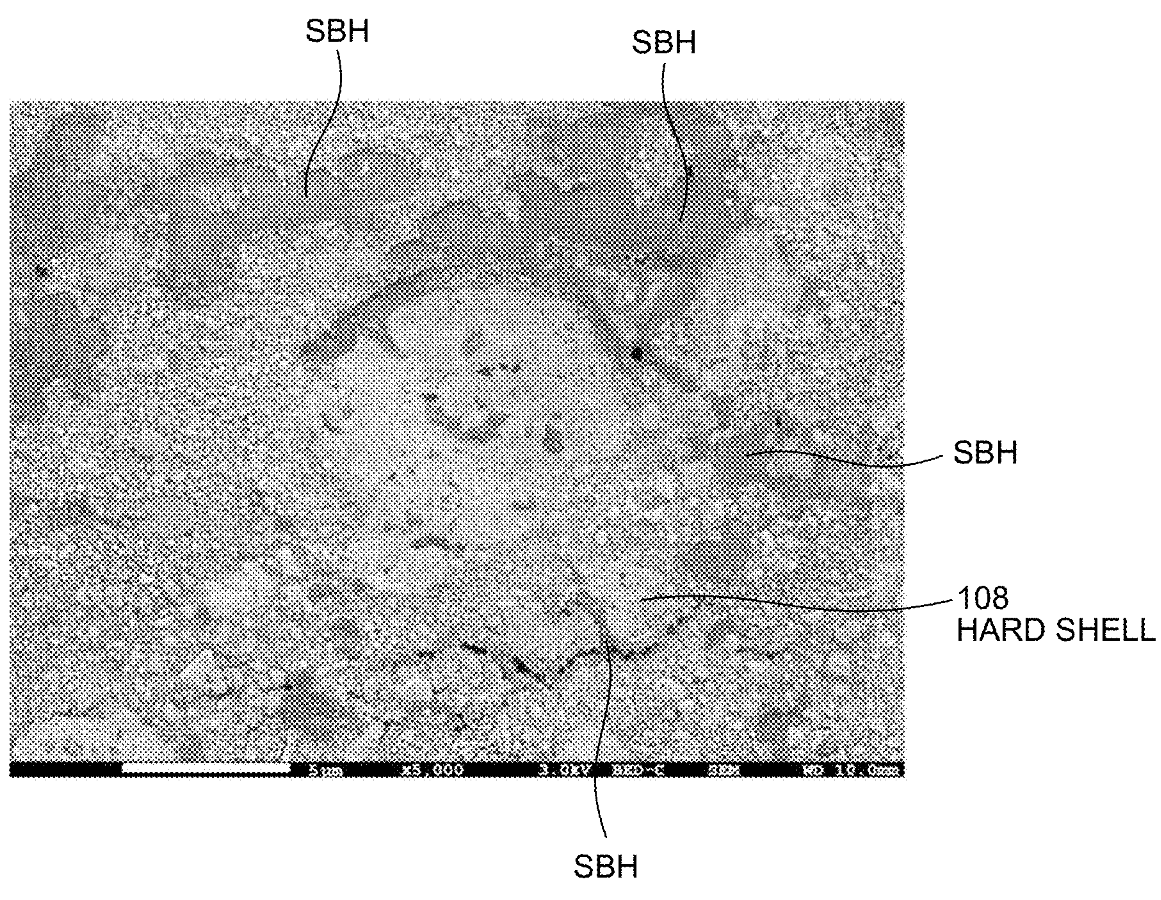
FIG. 9C is a backscattered electron image illustrating the state at the completion of reaction in Test Example 12 involving the addition of sodium hydroxide.

FIG. 9C is a backscattered electron image illustrating the state at the completion of reaction in Test Example 12 described later that involved the addition of sodium hydroxide. The magnification is 6 times the size of FIG. 9A.

As illustrated in FIG. 9C, the structure of the β"-alumina hard shell 108 is shown to contain sodium borohydride (SBH). The hard shell is broken into fine segments.

Figure 10A:
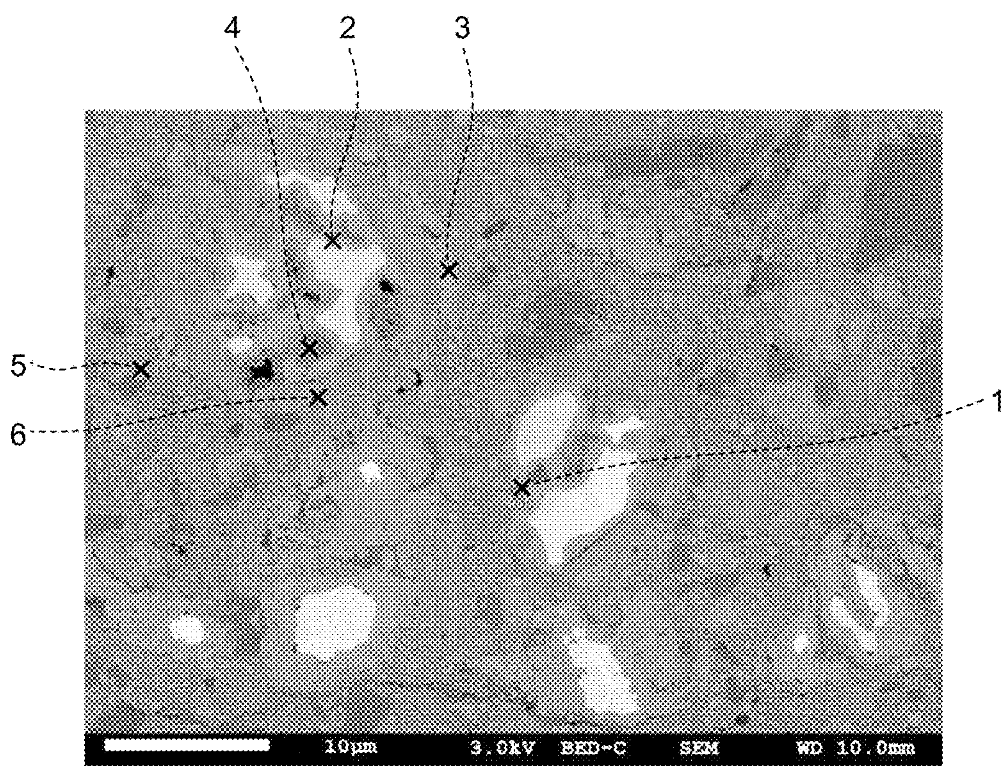
FIG. 10A is a backscattered electron image captured in the course of reaction in Test Example 12 before SEM mapping analysis.
Figure 10B:
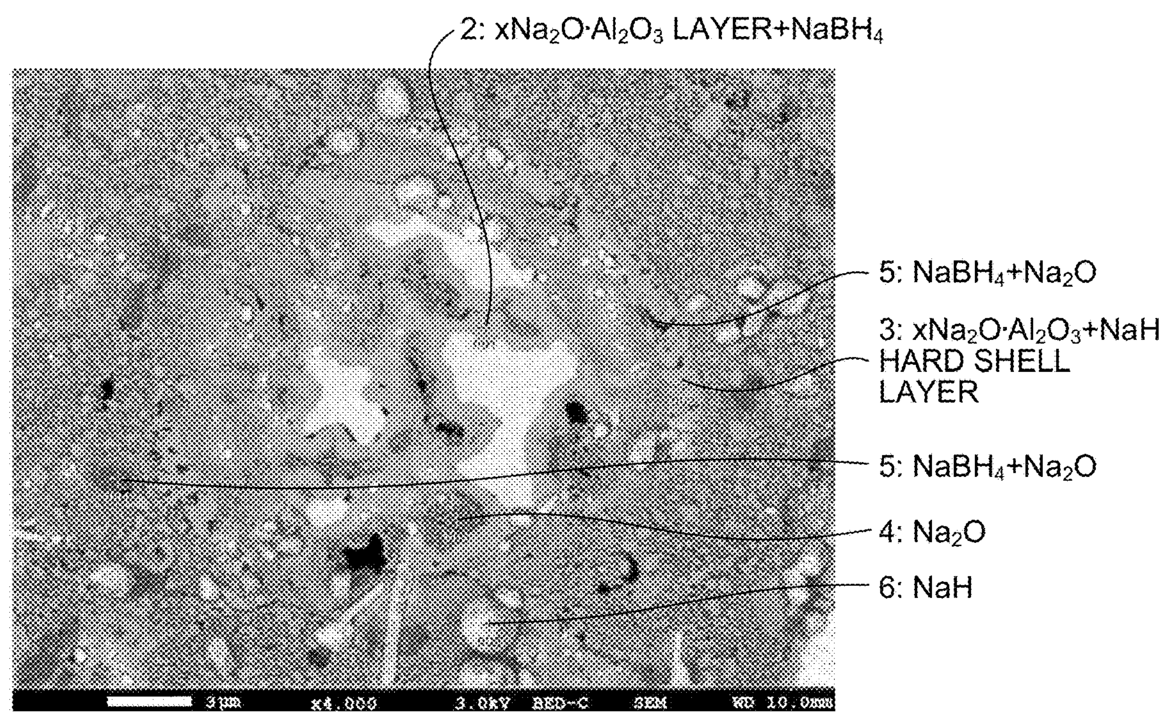
FIG. 10B is an image after SEM mapping analysis illustrating the positions of point analysis and the results of the estimation of chemical substances.

FIG. 10A is a backscattered electron image captured in the course of reaction in Test Example 12 described later before SEM mapping analysis. FIG. 10B is an image after SEM mapping analysis illustrating the positions of point analysis and the results of the estimation of chemical substances. The magnification of FIG. 10B is 2 times the size of FIG. 10A. FIG. 10C is a table illustrating the results (atomic proportions (%)) of SEM point analysis, performed after mapping analysis, at the locations corresponding to the numbers in FIG. 10A. The exudates seen in the backscattered electron image after mapping analysis illustrated in FIG. 10B will be discussed. For example, plot 6 in FIG. 10B corresponds to the point analysis No. 6 in FIG. 10C and is estimated as sodium hydride (NaH). Sodium hydride (NaH) melts when heavily irradiated with electron beams, and thus probably exuded here. Assuming that the exudates were sodium hydride, much sodium hydride (NaH) was detected at boundaries of $xNa_2O.Al_2O_3$ structures. Sodium hydride (NaH) was also detected in small amounts within the layers of the $xNa_2O.Al_2O_3$ structures. Incidentally, no sodium hydride (NaH) was detected in regions outside the hard shell layers where sodium metaborate ($NaBO_2$) was still present.

Figure 11A:
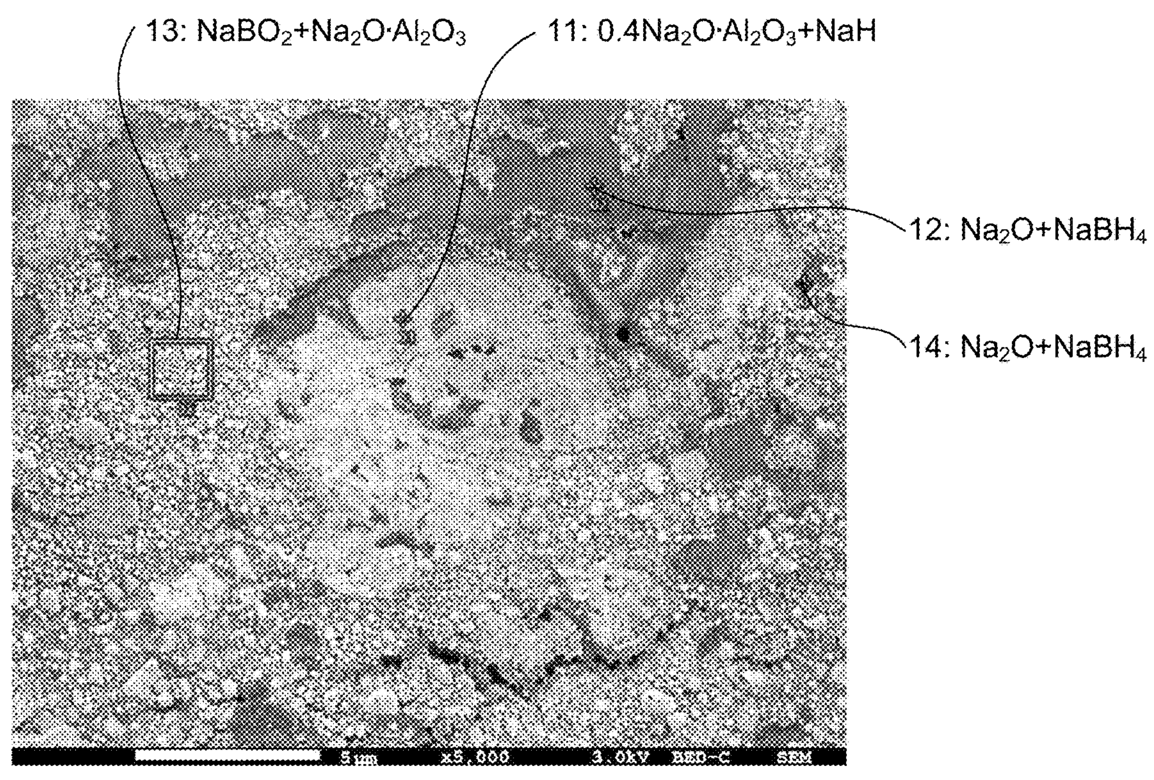
FIG. 11A is a backscattered electron image at the completion of reaction in Test Example 12 before mapping analysis.
Figure 11B:
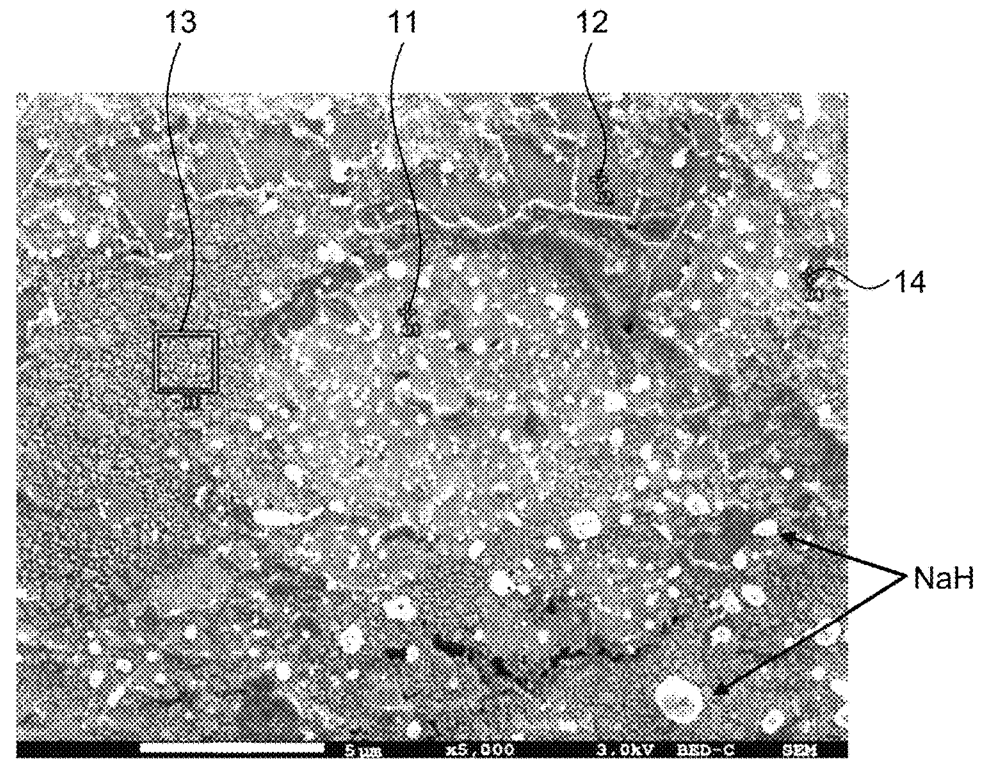
FIG. 11B is a SEM image after mapping analysis.

FIG. 11A is a backscattered electron image at the completion of reaction in Test Example 12 described later before mapping analysis. FIG. 11B is a SEM image after mapping analysis. FIG. 11C is a table illustrating the results (atomic proportions (%)) of SEM point analysis before mapping analysis. From these drawings, it has been shown that sodium hydride (NaH) is generated where $xNa_2O.Al_2O_3$ is present. Furthermore, sodium metaborate ($NaBO_2$) was present at plot 13 illustrated in FIG. 11B, and this spot was free from exudation, showing that there was no sodium hydride (NaH).

Third Embodiment

A sodium borohydride production method in the third embodiment includes the first step to the third step described in the sodium borohydride production method in the first embodiment. The description of features of the steps that are the same as in the first embodiment will be omitted, and features differing from the first embodiment will be described. The third embodiment differs from the first embodiment in that sodium diborate ($Na_4B_2O_5$) is used as the sodium borate ingredient at the first step.

In the present embodiment, sodium diborate ($Na_4B_2O_5$) is prepared beforehand by adding sodium hydroxide to a sodium borate. The Na/B (by mol) in sodium diborate ($Na_4B_2O_5$) is 2.

Sodium diborate ($Na_4B_2O_5$) is prepared in the following manner. Sodium tetraborate (hydrate) or sodium metaborate (hydrate), and sodium hydroxide are weighed out so that the Na/B ratio will be 2, and are added to an alkali-resistant vessel such as a nickel vessel. These are then heated to give a sodium borate hydrate melt, and the melt is held in the molten state by heating while avoiding bumping to vaporize water, thereby reducing the water content. The melt is then solidified. The solid containing the hydrate is heated to 400° C. and is held at the temperature for 1 to 4 hours to give a solid mixture of sodium oxide and sodium diborate. When Na/B=2 or less, the product is a mixture of sodium diborate and sodium metaborate. At a higher ratio, the product is a mixture of sodium diborate and sodium oxide. The solid obtained is highly hygroscopic, and is desirably stored in a vessel containing no or very little water and is desirably crushed into powder in a water-free atmosphere immediately before use.

In the method of the third embodiment, the reaction system is composed of aluminum powder (solid), sodium diborate (solid) and hydrogen (gas). To ensure that the reactions will proceed favorably in this reaction system, it is important that the water adsorbed at the second step be cleaned from the hermetic vessel by vacuum heat treatment in view of the fact that the sodium diborate powder is prone to adsorb water during its handling.

When the ingredients contain no water, stirring may be started immediately after the reaction temperature is reached. If, however, the ingredients contain residual water, stirring is initiated after oxidation reaction of aluminum. Stirring produces flaws in the oxide film on the aluminum surface to expose a new surface, where the ingredients are brought into contact with aluminum to undergo the sodium borohydride synthesis reaction.

When water has been completely removed and the reaction that starts is only the sodium borohydride reaction, oxides including those of aluminum occur but they do not form an oxide film on the aluminum surface because sodium borohydride (SBH) as the product occurs at the same time. With no oxide film being formed, the reactions proceed in accordance with the rates of diffusion of the ingredients through the solid. When sodium diborate is used as an ingredient, the amount of sodium oxide that is formed is large enough to avoid a shortage of sodium oxide at the reaction interfaces, thus allowing the reactions to proceed continuously.

In the third embodiment involving sodium diborate powder, aluminum is consumed by water in the sodium diborate powder. In view of this, aluminum is charged into the hermetic vessel at the first step in a molar ratio of aluminum to boron in sodium diborate of not less than 4/3. Specifically, it is preferable that aluminum be added in such an amount that the molar ratio of aluminum excluding the amount of aluminum that will be consumed by water is not less than 4/3 relative to boron in sodium diborate.

It is preferable that the amount of the aluminum powder ingredient that is added be 20 wt % larger in consideration of the loss of aluminum by the reaction with water and the formation of aluminum oxide.

TEST EXAMPLES AND COMPARATIVE EXAMPLES

The present embodiment will be described in greater detail hereinbelow by presenting Test Examples that illustrate advantageous effects of the present embodiment. However, it should be construed that the present embodiment is not limited to such examples.

In the following, Test Example 1 to Test Example 3 used sodium metaborate ($NaBO_2$).

Test Example 4 to Test Example 7 used sodium diborate ($Na_4B_2O_5$).

Test Example 8 used sodium metaborate ($NaBO_2$) and sodium diborate ($Na_4B_2O_5$).

Test Example 9 used sodium diborate ($Na_4B_2O_5$) and borax (sodium tetraborate ($Na_2B_4O_7$)).

Test Example 10 to Test Example 12 used sodium metaborate powder, and involved an alkali hydroxide (NaOH) as an additive.

Test Example 13 used sodium metaborate ($NaBO_2$) and borax (sodium tetraborate ($Na_2B_4O_7$)), and involved an alkali hydroxide (NaOH) as an additive.

Test Example 14 to Test Example 16 used sodium metaborate powder, and involved an alkali hydroxide (NaOH) as an additive. In Test Example 14 to Test Example 16, vacuum heating (drying under reduced pressure) was performed before the addition of hydrogen.

Test Example 17 used sodium metaborate powder, and involved an alkali oxide (CaO) as an additive.

Comparative Example 1 adopted the same conditions as in Test Example 1, but the temperature at the third step was increased (583° C.)

Comparative Example 2 reproduced Test Example 1 at a higher temperature (510° C.) and a lower maximum pressure (0.53 MPa) at the third step.

Comparative Example 3 reproduced Test Example 1 at a lower temperature (230° C.) at the third step.

Comparative Example 4 reproduced Test Example 1 at a higher temperature (673° C.) at the third step without performing stirring.

Comparative Example 5 reproduced Test Example 1 while changing the sodium borate to borax (Na/B=0.5).

Comparative Example 6 to Comparative Example 9 reproduced Test Example 11 while performing the second dehydration step with introduction of hydrogen and with medium stirring during heating.

Test Example 1

The sodium borate ingredient used in Test Example 1 is sodium metaborate powder.

(a) First Step

A mixture was prepared by mixing 1.94 g of sodium metaborate that had been crushed and screened through a 100 μm opening sieve, and 1.06 g of aluminum powder (average particle size: 30 μm) that would react with the above mass of sodium metaborate in a molar ratio of 4/3 as shown in the reaction formula (10) below. At room temperature, the mixture was charged into a hermetic vessel 10B illustrated in FIG. 4. Next, the hermetic vessel was connected to a vacuum pump and evacuated, and was thereafter filled with hydrogen gas (a non-oxidizing gas).

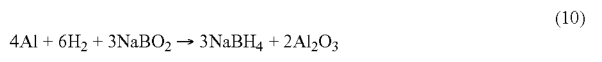

$$4Al + 6H_2 + 3NaBO_2 \rightarrow 3NaBH_4 + 2Al_2O_3 \quad (10)$$

(b) Second Step

After the first step, the ingredients were dehydrated at the second step (the water removal step) in which the inside of the hermetic vessel was heated to 300° C. while evacuating the hermetic vessel through the vacuum pump connected thereto to release water attached to the sodium metaborate and the aluminum powder, and water of hydration in the sodium metaborate.

(c) Third Step

Hydrogen gas (non-oxidizing gas) was introduced into the hermetic vessel to 0.5 MPa at room temperature, and thereafter the inside of the hermetic vessel was heated to 512° C. Immediately thereafter, the stirring unit in the hermetic vessel was operated to rotate the stirrer portions 22A, and the mixture was stirred at a stirrer's circumferential velocity of 40 cm/sec for 4.0 hours while keeping the heating temperature at 512° C. At the end of the third step, the stirring was terminated when the pressure increase in the hermetic vessel ceased, and the content was cooled. The initial hydrogen gas pressure in the above process was 0.93 MPa, and the final hydrogen gas pressure was 0.48 MPa. The stirring medium 40 used here was alumina balls (5 mm in diameter), and the weight ratio of the balls to the ingredients was 55.

In the manner described above, sodium borohydride (SBH) was obtained.

After the completion of the third step, the reaction yield was calculated from the amount of decrease in hydrogen gas pressure. The amount of decrease was determined by subtracting the minimum pressure under the reaction conditions from the maximum gas pressure, and converting the difference into the volume (the molar amount) of hydrogen gas. As a result, the reaction yield (SBH yield) was 33.6%.

Furthermore, the content of sodium borohydride in the reaction products was determined to be 12.0% by the iodometric titration method described below. The reaction yield converted from this content was 33.7%.

Iodometric Titration Method (1) The sample (the reaction products) was weighed out in 50 mg in a weighing bottle, and the weight was read to the first decimal place (to the 0.1 mg place).

(2) The sample weighed out in (1) was transferred to a 200 mL stoppered conical flask. 40 mL of a 20 g/L NaOH solution was added to the stoppered conical flask, and the mixture was warmed on a water bath to decompose the unreacted aluminum powder completely.

(3) The decomposition product from (2) was cooled to room temperature, and 20.0 mL of a 0.05 M iodine solution was added using a volumetric pipette. The flask was stoppered and was allowed to stand in a dark place for 15 minutes.

(4) 3 mL of hydrochloric acid was added to the flask from (3), and the flask was shaken well. The mixture was titrated with 0.1 M sodium thiosulfate.

(5) The titration was terminated when the purple color of iodine turned into colorless.

(6) A blank test was performed without the sample. The sodium borohydride content was calculated using the following equation.

Equation for Calculating Sodium Borohydride Content $$NaBH_4 \text{ (mass \%)} = \{(A-B)\times 0.1\times f\times 37.83/8\}/C\times 100$$

The variables and the constants in the equation are as described below.

A: Volume (mL) of 0.1 M sodium thiosulfate solution titrated in blank test

B: Volume (mL) of 0.1 M sodium thiosulfate solution titrated to sample solution f: Factor of 0.1 M sodium thiosulfate solution C: Amount (mg) of sample weighed 37.83: Molar mass (g/mol) of sodium borohydride 8: Normality (N) of 1 mol/L sodium borohydride solution Test Example 2

In Test Example 2, sodium borohydride (SBH) was obtained by repeating the procedures in Test Example 1 except that at the third step in Test Example 1, the heating temperature was changed to 520° C., and stirring was performed at a low rate (stirrer's circumferential velocity: 13 cm/sec) for 1.9 hours. As a result, the reaction yield (SBH yield) was 26.3%.

Test Example 3

Sodium borohydride (SBH) was obtained by repeating the procedures in Test Example 1 except that the sodium borate ingredient in Test Example 1 was replaced by 0.7 g of sodium metaborate and 1.48 g of borax, the heating temperature was changed to 516° C., and the amount of stirring time was changed to 2.9 hours. As a result, the reaction yield (SBH yield) was 21.6%.

Table 2 below lists the results of Test Example 1 to Test Example 3.

TABLE 2

| | Ingredient (g) | Borate ingredients (g) | | | Additive | Temp. | Hydrogen gas pressure [MPa] Maximum- | SBH conversion ratio (%) calculated from | Na/B | Water removal | Stirrer's circumferential |
|---|---|---|---|---|---|---|---|---|---|---|---|
| | Al | $NaBO_2$ | $Na_2B_4O_7$ | $Na_4B_2O_5$ | (g) | (° C.) | Final | hydrogen decrease | (by mol) | (% of water) | velocity (cm/s) |
| Test Ex. 1 | 1.06 | 1.94 | — | — | — | 512 | 0.93-0.48 | 33.6 | 1.00 | Yes (2%) | 40 |
| Test Ex. 2 | 1.07 | 1.95 | — | — | — | 520 | 0.99-0.70 | 26.3 | 1.00 | Yes (3%) | 13 |
| Test Ex. 3 | 1.05 | 0.7 | 1.48 | — | — | 516 | 1.02-0.82 | 21.6 | 0.63 | No (2%) | 40 |

Comparative Example 1

Sodium borohydride (SBH) was obtained by repeating the procedures in Test Example 1 except that at the third step in Test Example 1, the heating temperature was increased (583° C.), and the amount of stirring time was changed to 3.0 hours. As a result, the reaction yield (SBH yield) was 7.2%.

Comparative Example 2

Sodium borohydride (SBH) was obtained by repeating the procedures in Test Example 1 except that at the third step in Test Example 1, the heating temperature was changed to 510° C., the maximum pressure was lower (0.53 MPa), and the amount of stirring time was changed to 4.1 hours. As a result, the reaction yield (SBH yield) was 18.2%.

Comparative Example 3

Sodium borohydride (SBH) was obtained by repeating the procedures in Test Example 1 except that at the third step in Test Example 1, the heating temperature was lowered (230° C.), and the amount of stirring time was changed to 10.6 hours. As a result, the reaction yield (SBH yield) was 8.7%.

Comparative Example 4

Sodium borohydride (SBH) was obtained by repeating the procedures in Test Example 1 except that the amounts of the ingredients were halved compared to Test Example 1, and the third step was performed at a heating temperature of 673° C. without stirring. As a result, the reaction yield (SBH yield) was 2.1%.

Comparative Example 5

Sodium borohydride (SBH) was obtained by repeating the procedures in Test Example 1 except that the sodium borate ingredient in Test Example 1 was changed from sodium metaborate to 1.98 g of borax, the heating temperature was changed to 514° C., and the amount of stirring time was changed to 2.5 hours. Incidentally, Na/B in Comparative Example 5 was 0.5. As a result, the reaction yield (SBH yield) was 4.8%.

Table 3 below lists the results of Comparative Example 1 to Comparative Example 5.

Test Example 4

Sodium borohydride (SBH) was obtained by repeating the procedures in Test Example 1 except that the sodium borate ingredient at the first step in Test Example 1 was replaced by 2.94 g of sodium diborate ($Na_4B_2O_5$), and heating was performed at a heating temperature of 416° C. for 7.0 hours while performing stirring under rolling and milling conditions (stirrer's circumferential velocity: 140 cm/sec). In Test Example 4, Na/B (by mol) was 2.00.

In Test Example 4, water was removed by vacuum heating drying. The sodium diborate had been synthesized in an aqueous solution and water had been evaporated to dryness. The resultant solid had been crushed and dried at 400° C. However, the powder had absorbed water during storage in a desiccator, and had contained about 5% water. To avoid a decrease in reaction yield by this 5% water, vacuum heating drying was performed in the hermetic vessel prior to the stirring operation (the same applies to Test Example 5 and Test Example 6).

TABLE 3

| | Ingredient (g) | Borate ingredients (g) | | | Additive | Temp. | Hydrogen gas pressure [MPa] Maximum- | SBH conversion ratio (%) calculated from | Na/B | Water removal | Stirrer's circumferential |
|---|---|---|---|---|---|---|---|---|---|---|---|
| | Al | $NaBO_2$ | $Na_2B_4O_7$ | $Na_4B_2O_5$ | (g) | (° C.) | Final | hydrogen decrease | (by mol) | (% of water) | velocity (cm/s) |
| Comp. Ex. 1 | 1.06 | 1.95 | — | — | — | 583 | 0.97-0.90 | 7.2 | 1.00 | No (2%) | 40 |
| Comp. Ex. 2 | 1.06 | 1.95 | — | — | — | 510 | 0.53-0.33 | 18.2 | 1.00 | No (3%) | 40 |
| Comp. Ex. 3 | 1.06 | 1.98 | — | — | — | 230 | 0.74-0.68 | 8.7 | 1.00 | No (3%) | 40 |
| Comp. Ex. 4 | 0.56 | 0.97 | — | — | — | 673 | 0.84-0.80 | 2.1 | 1.00 | No (2%) | 0 |
| Comp. Ex. 5 | 1.06 | — | 1.98 | — | — | 514 | 0.86-0.82 | 4.8 | 0.5 | No (2%) | 40 |

As listed in Table 2, Test Example 1 to Test Example 3 that involved heating temperatures of 512° C. to 520° C. attained good SBH conversion ratios of 33.6%, 26.3% and 21.6%. Furthermore, as shown in Test Example 3, sodium borohydride was synthesized with good efficiency even when the ingredient was a mixture of sodium metaborate and borax.

In contrast, as listed in Table 3, in Comparative Example 1 that involved a high heating temperature of 583° C., the reaction stopped at a high hydrogen pressure stemming from the decomposition of sodium borohydride, and resulted in a low SBH conversion ratio of 7.2%. Comparative Example 2 involved a high temperature (510° C.) and a low maximum pressure (0.53 MPa) at the third step, and thus failed to attain enhanced synthesis of sodium borohydride, resulting in a low SBH conversion ratio of 18.2%. Comparative Example 3 involved a low temperature (230° C.) at the third step, and thus failed to attain enhanced synthesis of sodium borohydride, resulting in a low SBH conversion ratio of 8.7%. In Comparative Example 4, the temperature was 673° C. and stirring was not performed, and consequently the synthesis of sodium borohydride was not enhanced and the SBH conversion ratio was as low as 2.1%. Comparative Example 5 involved borax (Na/B=0.5) as the sodium borate, and thus failed to attain enhanced synthesis of sodium borohydride, resulting in a low SBH conversion ratio of 4.8%.

As a result, the reaction yield (SBH yield) was 32.6%.

Test Example 5

Sodium borohydride (SBH) was obtained by repeating the procedures in Test Example 4 except that at the third step in Test Example 4, heating was performed at a heating temperature of 509° C. for 7.1 hours while performing stirring (stirrer's circumferential velocity: 40 cm/sec). In Test Example 5, Na/B (by mol) was 2.00. As a result, the reaction yield (SBH yield) was 60.4%.

Test Example 6

Sodium borohydride (SBH) was obtained by repeating the procedures in Test Example 4 except that at the third step in Test Example 4, heating was performed at a heating temperature of 560° C. for 4.0 hours while performing stirring (stirrer's circumferential velocity: 40 cm/sec). In Test Example 6, Na/B (by mol) was 2.00.

As a result, the reaction yield (SBH yield) was 57.6%.

Test Example 7

Sodium borohydride (SBH) was obtained by repeating the procedures in Test Example 4 except that the amount of the aluminum powder ingredient in Test Example 4 was increased by 20 wt % to 1.27 g, and at the third step heating was performed at a heating temperature of 495° C. for 7.1 hours while performing stirring (stirrer's circumferential velocity: 40 cm/sec). In Test Example 7, Na/B (by mol) was 2.00. As a result, the reaction yield (SBH yield) was 73.2%.

Test Example 8

Sodium borohydride (SBH) was obtained by repeating the procedures in Test Example 4 except that the sodium borate ingredient in Test Example 4 was replaced by 0.82 g of sodium metaborate and 1.31 g of sodium diborate, and heating was performed at a heating temperature of 496° C. for 12.8 hours while performing stirring (stirrer's circumferential velocity: 40 cm/sec). As a result, the reaction yield (SBH yield) was 40.7%.

Test Example 9

Sodium borohydride (SBH) was obtained by repeating the procedures in Test Example 4 except that the sodium borate ingredient in Test Example 4 was replaced by 0.98 g of borax and 1.0 g of sodium diborate, and heating was performed at a heating temperature of 495° C. for 7.6 hours while performing stirring (stirrer's circumferential velocity: 40 cm/sec). As a result, the reaction yield (SBH yield) was 37.5%.

Table 4 below lists the results of Test Example 4 to Test Example 9.

TABLE 4

| | Ingredient (g) | Borate ingredients (g) | | | Additive | Temp. | Hydrogen gas pressure [MPa] Maximum- | SBH conversion ratio (%) calculated from | Na/B | Water removal | Stirrer's circumferential |
|---|---|---|---|---|---|---|---|---|---|---|---|
| | Al | $NaBO_2$ | $Na_2B_4O_7$ | $Na_4B_2O_5$ | (g) | (° C.) | Final | hydrogen decrease | (by mol) | (% of water) | velocity (cm/s) |
| Test. Ex. 4 | 1.06 | — | — | 2.94 | — | 416 | 0.83-0.55 | 32.6 | 2.00 | Yes (5%) | 140 |
| Test. Ex. 5 | 1.06 | — | — | 2.94 | — | 509 | 0.89-0.65 | 60.4 | 2.00 | Yes (5%) | 40 |
| Test. Ex. 6 | 1.06 | — | — | 2.94 | — | 560 | 0.93-0.48 | 57.6 | 2.00 | Yes (5%) | 40 |
| Test. Ex. 7 | 1.27 | — | — | 2.85 | — | 495 | 0.89-0.75 | 73.2 | 2.00 | Yes (5%) | 40 |
| Test. Ex. 8 | 1.28 | 0.82 | — | 1.31 | — | 496 | 0.89-0.73 | 40.7 | 1.52 | Yes (4%) | 40 |
| Test. Ex. 9 | 1.06 | — | 0.98 | 1.00 | — | 495 | 0.90-0.76 | 37.5 | 1.02 | Yes (3%) | 40 |

As listed in Table 4, Test Example 4 to Test Example 7 resulted in good SBH conversion ratios of 32.6%, 60.4%, 57.6% and 73.2%. In particular, Test Example 7 achieved a high SBH conversion ratio of 73.2% by virtue of 20 wt % increase in the amount of aluminum powder that compensated for the loss of aluminum by oxidation reaction. The SBH conversion ratio was also as high as 40.7% and 37.5% in Test Example 8 that involved sodium metaborate and sodium diborate as the sodium borates, and in Test Example 9 that involved borax and sodium diborate as the sodium borates.

Test Example 10

At the first step in Test Example 1, the aluminum powder was added in an amount of 1.33 g, and sodium hydroxide powder was added in an amount of 1.18 g. Sodium borohydride (SBH) was thus obtained. In Test Example 10, Na/B (by mol) was 2.00. As a result, the reaction yield (SBH yield) was 40.7%.

Test Example 11

In Test Example 11, the system before stirring was held at a predetermined temperature to remove water by reaction with aluminum.

Figure 12:
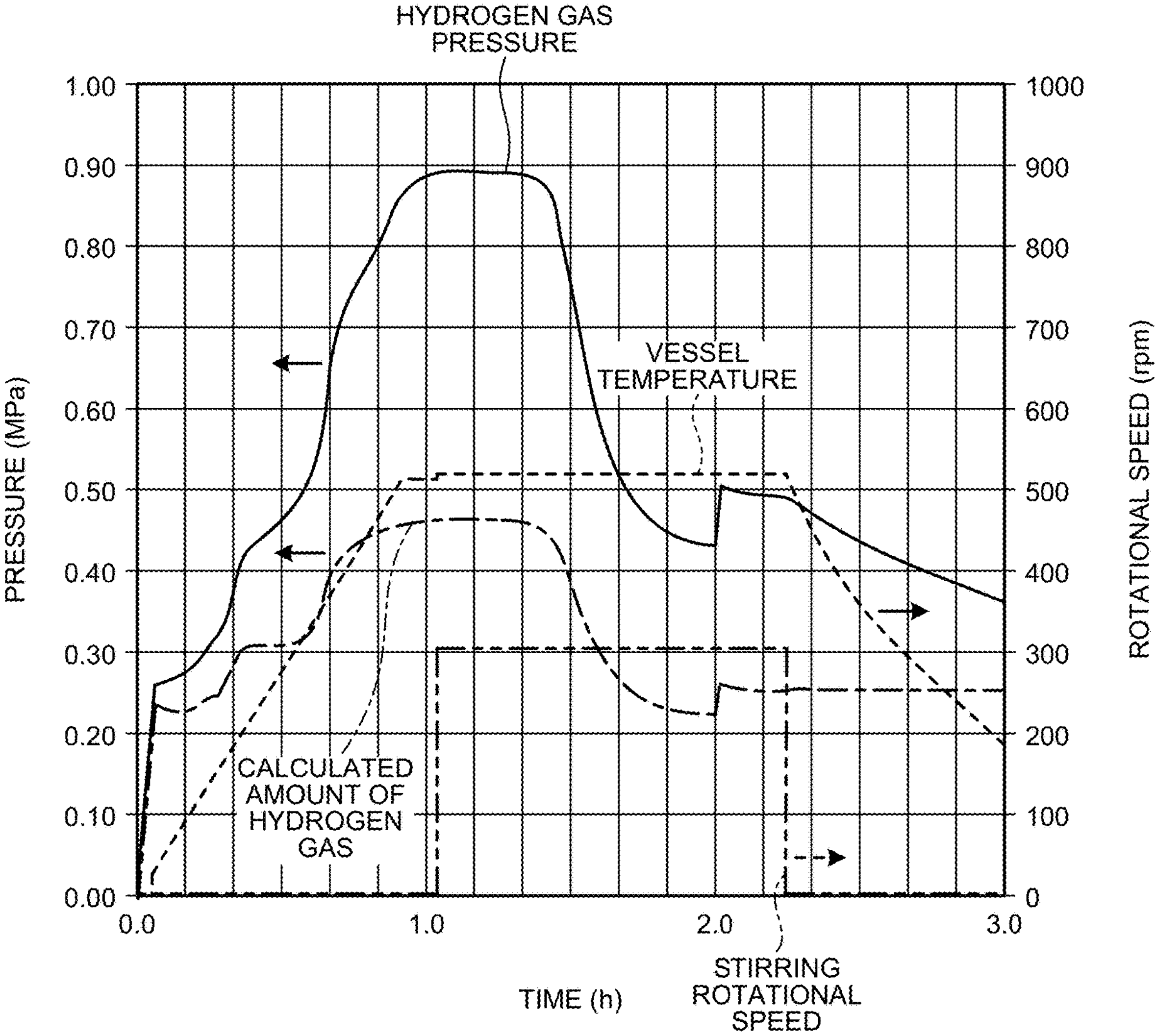
FIG. 12 is a graph illustrating the production process in the sodium borohydride production method in Test Example 11.

FIG. 12 is a graph illustrating the production process in the sodium borohydride production method in Test Example 11.

At the first step, a mixture was prepared by mixing 1.94 g of sodium metaborate that had been screened through a 100 μm opening sieve, 2.36 g of sodium hydroxide powder, and 1.59 g of aluminum powder (average particle size: 30 μm) that included 1.06 g corresponding to 4/3 times the moles of boron in the sodium metaborate and 0.53 g corresponding to the amount of aluminum that would be consumed by the reaction with water contained in 2.36 g of the sodium hydroxide. The mixture was charged into a hermetic vessel, and the hermetic vessel was evacuated at room temperature, then filled with hydrogen gas to 0.25 MPa, and tightly closed.

At the second step, the inside of the hermetic vessel was heated to 515° C. and was held at the temperature for 15 minutes to vaporize water contained in the sodium metaborate powder, the sodium hydroxide powder and the aluminum powder. The water was then removed by reaction with aluminum. The pressure inside the hermetic vessel increased to 0.88 MPa due to the elevated temperature and the generation of hydrogen gas by the reaction of water. During this process, the stirring unit was idle, i.e., the hydrogen gas-generating reaction was performed without stirring.

At the third step, the inside of the hermetic vessel was heated to 520° C., and the stirring unit was operated to start stirring at a rotational speed of 300 rpm (stirrer's circumferential velocity: 40 cm/sec). The pressure inside the hermetic vessel increased to 0.88 MPa. The hydrogen gas pressure started to fall sharply 0.5 hours after the start of stirring, and lowered to 0.43 MPa after 0.95 hours of stirring. At this point, hydrogen gas was introduced to raise the pressure inside the hermetic vessel to 0.5 MPa.

Thereafter, stirring was performed for 0.3 hours but there was no decrease in hydrogen gas pressure. Stirring and heating were then terminated. Sodium borohydride (SBH)

was thus obtained. In Test Example 11, Na/B (by mol) was 3.00. As a result, the reaction yield (SBH conversion ratio) calculated from the amount of decrease in hydrogen gas was 49.8%. The stirring medium used here was alumina balls (5 mm in diameter), and the weight ratio of the balls to the ingredients was 55 similarly to Test Example 1.

Test Example 12

At the first step in Test Example 11, the sodium hydroxide powder was added in an amount of 2.35 g; at the second step, the conditions were changed to 515° C. and 95 minutes; and at the third step, the heating temperature was changed to 515° C. The hermetic vessel was replaced by a hermetic vessel 10C that included a stirrer illustrated in FIG. 5B (a J-shaped stirrer portion 22B) and contained two columnar mullite balls as a stirring medium 40 (3.1 g×2, weight ratio to ingredients: 1.16). The rotational speed was such that the stirrer's circumferential velocity was 130 cm/sec, and the amount of stirring time was changed to 4.0 hours. The rest of the procedures was the same as in Test Example 11. Sodium borohydride (SBH) was thus obtained. In Test Example 12, Na/B (by mol) was 2.95. As a result, the reaction yield (SBH yield) was 64.2%.

Test Example 13

Sodium borohydride (SBH) was obtained by repeating the procedures in Test Example 10 except that the sodium borate ingredient in Test Example 10 was replaced by 0.95 g of sodium metaborate and 1.56 g of borax, the aluminum powder was added in an amount of 1.60 g, the sodium hydroxide powder was added in an amount of 2.35 g, the heating temperature was changed to 495° C., and the amount of stirring time was changed to 8.5 hours. In Test Example 13, Na/B (by mol) was 1.95. As a result, the reaction yield (SBH yield) was 59.8%.

Test Example 14

At the second step in Test Example 10, water was removed out of the system by drying at 400° C. under a reduced pressure for 4 hours. At the third step, hydrogen was introduced, heating was performed inside the hermetic vessel immediately followed by the start of operation of the stirring unit in the hermetic vessel to rotate the stirrer at a circumferential velocity of 40 cm/sec, and stirring was performed for 6.8 hours while maintaining the heating temperature at 501° C. In this process, the amount of the sodium hydroxide powder added was 2.34 g. Sodium borohydride (SBH) was thus obtained. In Test Example 14, Na/B (by mol) was 2.97. As a result, the reaction yield (SBH yield) was 53.2%.

Test Example 15

In Test Example 14, stirring was performed for 6.1 hours while maintaining the heating temperature at 522° C. The amount of the sodium hydroxide powder added was 2.36 g. Sodium borohydride (SBH) was thus obtained. In Test Example 15, Na/B (by mol) was 2.98. As a result, the reaction yield (SBH yield) was 58.6%.

Test Example 16

In Test Example 14, stirring was performed for 7.6 hours while maintaining the heating temperature at 505° C. The amount of the sodium hydroxide powder added was 1.17 g. Sodium borohydride (SBH) was thus obtained. In Test Example 16, Na/B (by mol) was 1.99. As a result, the reaction yield (SBH yield) was 60.8%.

Test Example 17

Sodium borohydride (SBH) was obtained by repeating the procedures in Test Example 1 except that at the first step in Test Example 1, sodium hydroxide was replaced by 0.55 g of calcium oxide powder, and heating was performed at a heating temperature of 495° C. for 18.0 hours. In Test Example 17, Na (including Ca)/B (by mol) was 1.33. As a result, the reaction yield (SBH yield) was 42.7%.

Table 5 below lists the results of Test Example 10 to Test Example 17.

TABLE 5

| | Ingredient (g) | Borate ingredients (g) | | | Additive | Temp. | Hydrogen gas pressure [MPa] Maximum- | SBH conversion ratio (%) calculated from | Na/B | Water removal | Stirrer's circumferential |
|---|---|---|---|---|---|---|---|---|---|---|---|
| | Al | $NaBO_2$ | $Na_2B_4O_7$ | $Na_4B_2O_5$ | (g) | (° C.) | Final | hydrogen decrease | (by mol) | (% of water) | velocity (cm/s) |
| Test. Ex. 10 | 1.33 | 1.94 | — | — | NaOH (1.18) | 520 | 1.13-0.71 | 40.7 | 2.00 | No (12%) | 40 |
| Test. Ex. 11 | 1.59 | 1.94 | — | — | NaOH (2.36) | 515 | 0.88-0.50 | 49.8 | 3.00 | Yes (13%) | 40 |
| Test. Ex. 12 | 1.63 | 1.98 | — | — | NaOH (2.35) | 515 | 0.91-0.63 | 64.2 | 2.95 | Yes (13%) | 130 |
| Test. Ex. 13 | 1.60 | 0.95 | 1.56 | — | NaOH (2.35) | 495 | 0.88-0.62 | 59.8 | 1.95 | Yes (11%) | 40 |
| Test. Ex. 14 | 1.44 | 1.95 | — | — | NaOH (2.34) | 501 | 0.91-0.53 | 53.2 | 2.97 | Yes (13%) | 40 |
| Test. Ex. 15 | 1.43 | 1.96 | — | — | NaOH (2.36) | 522 | 0.87-0.48 | 58.6 | 2.98 | Yes (13%) | 40 |
| Test. Ex. 16 | 1.28 | 1.94 | — | — | NaOH (1.17) | 505 | 0.88-0.51 | 60.8 | 1.99 | Yes (13%) | 40 |
| Test. Ex. 17 | 1.06 | 1.94 | — | — | CaO (0.55) | 495 | 0.89-0.83 | 42.7 | 1.33 | No (2%) | 40 |

As listed in Table 5, Test Example 10 that involved the addition of sodium hydroxide resulted in a SBH conversion ratio of 40.7% and attained a marked enhancement compared to a SBH conversion ratio of 26.3% in Test Example 2 that did not involve the addition of sodium hydroxide.

In Test Example 11 to Test Example 13, the large amount of water derived from sodium hydroxide was successfully removed by reactive dehydration prior to stirring, and consequently good SBH conversion ratios of 49.8%, 64.2% and 59.8% were obtained.

As mentioned hereinabove, SEM analysis was performed in Test Example 12. The SEM mapping analysis illustrated in FIG. 9A to FIG. 11B will be discussed. The stirring conditions were a J-shaped stirrer, two ceramic balls with a weight ratio of 1.16 relative to the ingredients, and a circumferential velocity of 130 cm/sec. Under these conditions in which the volume of the ingredients is larger than the medium, the medium balls have a low chance of collision and will catch a large amount of the ingredients therebetween at the time of their collision. Thus, the stirring was soft stirring that left the hard shells as such. The shape of the aluminum that remained had changed from the initial oval to an odd-form as a result of the progress of the reaction along defects. The reaction had occurred also outside of the hard shells as a result of the diffusion of sodium hydride, and this probably contributed to the enhancement in reaction yield. In Test Example 14 to Test Example 16, the large amount of water derived from sodium hydroxide was successfully removed by drying under a reduced pressure. In Test Example 14 to Test Example 16, SBH was synthesized by introducing hydrogen after the water removal. By virtue of this water removal in advance of the synthesis reaction, sodium borohydride was synthesized efficiently with good SBH conversion ratios of 53.2%, 58.6% and 60.8%. Test Example 17 that involved calcium oxide in place of sodium hydroxide similarly achieved efficient synthesis of sodium borohydride with a SBH conversion ratio of 42.7%.

Comparative Example 6

At the second step in Test Example 11, the stirring unit was operated to start stirring in a hydrogen atmosphere at a rotational speed of 90 rpm (stirrer's circumferential velocity: 12 cm/sec), and water was removed while performing soft stirring.

The stirring medium 40 used here was stainless steel balls (5 mm in diameter), and the weight ratio of the balls to the ingredients was 110. The hermetic vessel was replaced by a hermetic vessel 10C that included a stirrer illustrated in FIG. 5A (a J-shaped stirrer portion 22B), and stirring was performed at a rotational speed of 300 rpm (stirrer's circumferential velocity: 40 cm/sec). The heating temperature was changed to 515° C., and the amount of stirring time was 1.3 hours. The rest of the procedures was the same as in Test Example 11. Sodium borohydride (SBH) was thus obtained. As a result, the reaction yield (SBH yield) was 12.5%.

Comparative Example 7

Sodium borohydride (SBH) was obtained in accordance with the procedures in Test Example 11 while changing the heating temperature to 321° C. and the amount of stirring time to 5.0 hours. At the second step in this process, stirring was started in a hydrogen atmosphere at a rotational speed of 1150 rpm (stirrer's circumferential velocity: 140 cm/sec), and water was removed while performing stirring. As a result, the reaction yield (SBH yield) was 22.5%.

Comparative Example 8

Sodium borohydride (SBH) was obtained by repeating the procedures in Comparative Example 6 except that at the first step in Comparative Example 6, sodium hydroxide powder was added in an amount of 5.89 g, and at the third step the heating temperature was changed to 520° C. and the amount of stirring time was changed to 5 hours. In Comparative Example 8, Na/B (by mol) was 6.00. As a result, the reaction yield (SBH yield) was 16.7%.

Comparative Example 9

Sodium borohydride (SBH) was obtained by repeating the procedures in Comparative Example 6 except that the sodium borate ingredient in Comparative Example 6 was replaced by 1.97 g of sodium metaborate and 1.50 g of borax, the heating temperature was changed to 519° C., and the amount of stirring time was changed to 3.6 hours. The stirring medium 40 used here was alumina balls (5 mm in diameter), and the weight ratio of the balls to the ingredients was55. As a result, the reaction yield (SBH yield) was 13.3%.

Table 6 below lists the results of Comparative Examples 6 to 9.

TABLE 6

| | Ingredient (g) | Borate ingredients (g) | | | Additive | Temp. | Hydrogen gas pressure [MPa] Maximum- | SBH conversion ratio (%) calculated from | Na/B | | Stirrer's circumferential |
|---|---|---|---|---|---|---|---|---|---|---|---|
| | Al | $NaBO_2$ | $Na_2B_4O_7$ | $Na_4B_2O_5$ | (g) | (° C.) | Final | hydrogen decrease | (by mol) | Water removal | velocity (cm/s) |
| Comp. Ex. 6 | 1.61 | 1.99 | — | — | NaOH (2.36) | 515 | 0.88-0.62 | 12.5 | 2.95 | Yes (13%) | 40 |
| Comp. Ex. 7 | 1.61 | 1.96 | — | — | NaOH (2.36) | 321 | 0.73-0.56 | 22.5 | 2.97 | Yes (13%) | 140 |
| Comp. Ex. 8 | 2.34 | 1.94 | — | — | NaOH (5.89) | 520 | 1.17-1.01 | 16.7 | 6.00 | Yes (17%) | 40 |
| Comp. Ex. 9 | 1.07 | 1.97 | 1.50 | — | NaOH (0.54) | 519 | 0.94-0.77 | 13.3 | 0.98 | Yes (6%) | 40 |

As shown in Comparative Example 6 to Comparative Example 9 in Table 6, the sodium borohydride (SBH) conversion ratio (%) was lowered because medium stirring was performed as early as during the heating for water removal at the second step.

Specifically, although the stirring was soft stirring, the early stirring at the start of heating and the use of a stirring medium milled down soft sodium metaborate. Water generated from sodium hydroxide adsorbed to the fine fragments of sodium metaborate, and persisted on the fine fragments of sodium metaborate even when held at a temperature of 321° C. to 520° C. and was detached slowly over a long period of time. As a result, the oxidation reaction of aluminum was extended in time and soft shells were formed continuously. Furthermore, the soft stirring concurrent with the generation of water destroyed the soft shells that had been formed, and the destroyed soft shells remained in a mixed state at the offshore of the aluminum particles (at regions away from the surface of the aluminum particles). Thus, less sodium oxide ($Na_2O$) released from the soft shells were present in the vicinity of aluminum, and the reaction cycle starting from sodium oxide through sodium, sodium hydride, sodium borohydride (SBH) and back to sodium oxide was not established to cause a low reaction yield.

Comparative Examples 6, 8 and 9, which involved soft stirring, resulted in a lower reaction yield (SBH yield) than Test Examples. Comparative Example 7, in which the ingredients were positively stirred and were rolled and milled, resulted in a large deformation of aluminum, and the newly exposed interfaces offered an increased chance of contact for the ingredients present at the offshore. Thus, the reaction yield was slightly higher than other Comparative Examples.

REFERENCE SIGNS LIST

10A, 10B, 10C HERMETIC VESSEL
12 MAIN VESSEL BODY
14 COVER
16 HEATER
18 O-RING
20 MOTOR
22 STIRRING ROD
22A STIRRER PORTION
22B J-SHAPED STIRRER PORTION
24 FIRST PIPE
26 HYDROGEN GAS SUPPLY VALVE
28 DISCHARGE VALVE
30 SECOND PIPE
32 PRESSURE GAUGE
40 STIRRING MEDIUM
51 SODIUM BORATE
52 ALUMINUM POWDER
53 NON-OXIDIZING GAS
54 FLUORIDE
101 ALUMINUM PARTICLE
102 DENSE OXIDE FILM
103 sodium hydroxide (NaOH)
104 boehmite ($Al_2O_3.xH_2O$) layer
105 SODIUM OXIDE ($Na_2O$)
106 hydrogen ($H_2$)
107 SOFT SHELL
108 HARD SHELL
109 METALLIC SODIUM (Na)
110 SODIUM HYDRIDE (NaH)
111 DIBORON TRIOXIDE ($B_2O_3$)
112 SODIUM BOROHYDRIDE (SBH)

The invention claimed is:

1. A sodium borohydride production method comprising:
dehydrating a mixture including a sodium borate and aluminum powder in a hydrogen gas atmosphere in a static condition; and
reacting a mixture of the dehydrated sodium borate and aluminum powder in a hydrogen atmosphere at not less than 400° C. and not more than 560° C. while performing stirring;
wherein a molar ratio of sodium to boron in the sodium borate is larger than 0.5.

2. The sodium borohydride production method according to claim 1, the sodium borohydride production method further comprising adding an alkali metal oxide or an alkaline earth metal oxide, wherein
a molar ratio of moles of any alkali metal and alkaline earth metal plus any alkali metal and alkaline earth metal contained in the sodium borate is more than 0.5 and not more than 3 relative to moles of boron contained in the sodium borate.

3. The sodium borohydride production method according to claim 1, the sodium borohydride production method further comprising adding an alkali metal hydroxide, wherein
a molar ratio of moles of any alkali metal contained in the alkali metal hydroxide and the sodium borate is more than 0.5 and not more than 3 relative to moles of boron contained in the sodium borate.

4. The sodium borohydride production method according to claim 1, wherein a molar ratio of any alkali metal and alkaline earth metal contained in the sodium borate to boron in the sodium borate is not less than 1.33.

* * * * *